(12) United States Patent
Yoshikane

(10) Patent No.: US 10,512,997 B2
(45) Date of Patent: Dec. 24, 2019

(54) DUST COLLECTOR FOR ELECTRIC POWER TOOL AND ELECTRIC POWER TOOL

(71) Applicant: MAKITA CORPORATION, Anjo-shi, Aichi (JP)

(72) Inventor: Kiyonobu Yoshikane, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 15/845,204

(22) Filed: Dec. 18, 2017

(65) Prior Publication Data
US 2018/0200852 A1 Jul. 19, 2018

(30) Foreign Application Priority Data

Jan. 16, 2017 (JP) .................................. 2017-005298
Jan. 16, 2017 (JP) .................................. 2017-005299
Jan. 16, 2017 (JP) .................................. 2017-005300

(51) Int. Cl.
*B23Q 11/00* (2006.01)
*B23B 47/34* (2006.01)

(52) U.S. Cl.
CPC .......... *B23Q 11/0046* (2013.01); *B23B 47/34* (2013.01); *B23B 2260/058* (2013.01); *Y10T 408/50* (2015.01)

(58) Field of Classification Search
CPC . B23B 39/006; B23B 47/34; B23B 2260/058; B23Q 11/0046; Y10T 408/50
See application file for complete search history.

(56) References Cited

U.S. PATENT DOCUMENTS

| 4,097,176 | A | * | 6/1978 | Wanner ................ B23Q 1/0036 175/213 |
| 4,207,953 | A | * | 6/1980 | Reibetanz ............. B23B 49/006 173/21 |
| 5,090,499 | A | * | 2/1992 | Cuneo ................. B23Q 11/0046 173/75 |
| 5,129,467 | A | * | 7/1992 | Watanabe .......... B23Q 11/0046 173/217 |

(Continued)

FOREIGN PATENT DOCUMENTS

EP 1714734 A1 * 10/2006 ......... B23Q 11/0046
JP 2008-207258 A 9/2008

(Continued)

*Primary Examiner* — Eric A. Gates
(74) *Attorney, Agent, or Firm* — Oliff PLC

(57) ABSTRACT

A dust collector for an electric power tool includes a main body case, a tubular sliding portion, and a dust collection portion. The main body case is mountable to an electric power tool. The tubular sliding portion is disposed on the main body case. The sliding portion includes a nozzle on a front end thereof. The nozzle includes a suction opening. The dust collection portion is configured to accumulate dust suctioned from the nozzle. The sliding portion includes a guided portion supported by a guiding portion disposed on the main body case. The guided portion is supported slidably in a front-rear direction, and the guiding portion and the guided portion are disposed in a region on a half side with respect to a line on a cross section passing through a center of the sliding portion.

17 Claims, 34 Drawing Sheets

(56) References Cited

U.S. PATENT DOCUMENTS

| | | | | |
|---|---|---|---|---|
| 6,851,898 B2* | 2/2005 | Ege | ............ | B23Q 11/0046 408/241 S |
| 7,017,680 B2* | 3/2006 | Arich | ............ | B23Q 1/0009 173/171 |
| 7,182,150 B2* | 2/2007 | Grossman | ............ | B23Q 1/0009 173/171 |
| 7,425,109 B2* | 9/2008 | Simm | ............ | B23Q 11/0046 173/198 |
| 7,909,114 B2* | 3/2011 | Nishikawa | ............ | B23Q 11/0046 173/198 |
| 8,876,932 B2* | 11/2014 | Machida | ............ | B23Q 11/0046 173/171 |
| 8,906,124 B2* | 12/2014 | Yoshikane | ............ | B23Q 11/0046 173/198 |
| 8,967,923 B2* | 3/2015 | Lerch | ............ | B23Q 11/0071 408/67 |
| 8,997,887 B2* | 4/2015 | Furusawa | ............ | B23Q 11/0046 173/198 |
| 9,056,379 B2* | 6/2015 | Yoshikane | ............ | B23Q 11/0046 |
| 9,943,940 B2* | 4/2018 | Furusawa | ............ | B23Q 11/0046 |
| 2001/0052429 A1* | 12/2001 | Frenzel | ............ | B23Q 11/0046 175/210 |
| 2012/0043101 A1* | 2/2012 | Ishikawa | ............ | B23Q 11/0046 173/75 |
| 2013/0213683 A1* | 8/2013 | Brewster | ............ | B23Q 11/00 173/198 |
| 2017/0057037 A1* | 3/2017 | Lauer | ............ | B23Q 11/0071 |
| 2017/0203402 A1* | 7/2017 | Machida | ............ | B01D 45/16 |
| 2017/0232565 A1* | 8/2017 | Machida | ............ | B23Q 11/0071 173/198 |
| 2017/0355053 A1* | 12/2017 | Furusawa | ............ | B23Q 11/0046 |
| 2018/0021905 A1* | 1/2018 | Furusawa | ............ | B23B 47/34 451/453 |
| 2018/0085873 A1* | 3/2018 | Rompel | ............ | B23Q 11/0046 |
| 2018/0147681 A1* | 5/2018 | Le | ............ | B25F 5/003 |
| 2018/0199794 A1* | 7/2018 | Nemetz | ............ | B23Q 11/0071 |

FOREIGN PATENT DOCUMENTS

| | | |
|---|---|---|
| JP | 2011-189487 A | 9/2011 |
| JP | 5707293 B2 | 4/2015 |

* cited by examiner

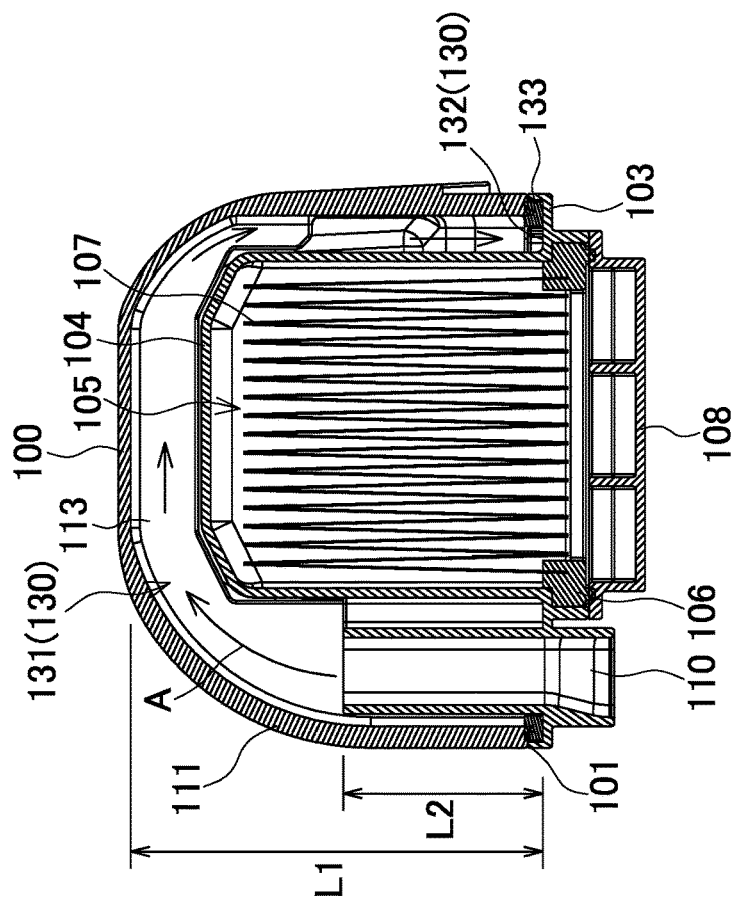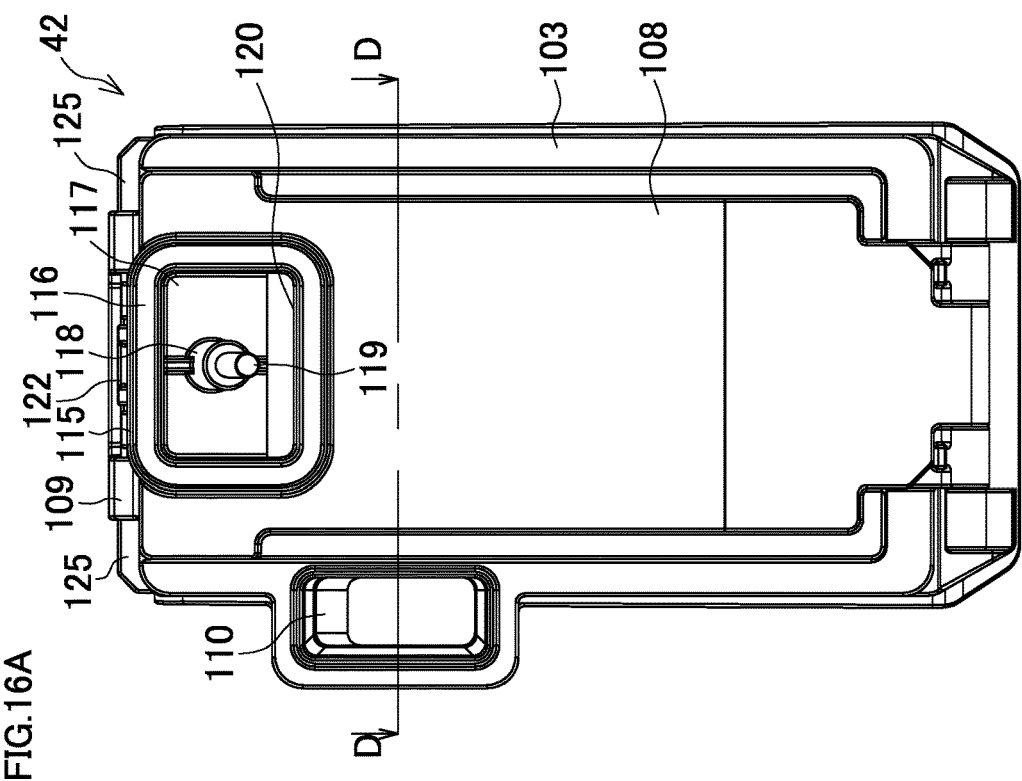

DUST COLLECTOR FOR ELECTRIC POWER TOOL AND ELECTRIC POWER TOOL

BACKGROUND

This application claims the benefits of Japanese Patent Application Numbers 2017-005298 filed on Jan. 16, 2017, 2017-005299 filed on Jan. 16, 2017, and 2017-005300 Jan. 16, 2017, the entirety of which is incorporated by reference.

TECHNICAL FIELD

This disclosure relates to a dust collector for electric power tool mounted on an electric power tool such as an electric drill and a hammer drill, and an electric power tool on which the dust collector is installed.

RELATED ART

An electric power tool such as an electric drill and a hammer drill sometimes includes a dust collector that collects dust generated from a workpiece in a drilling work and similar work. As the dust collector for the electric power tool, a dust collector disclosed in Japanese Patent No. 5707293 has been known. Here, the dust collector includes a housing mounted on a housing of the electric power tool, the housing of the dust collector has a front end on which a ventilation member (a slide pipe) is disposed projecting forward and slidable in a front-rear direction. The ventilation member includes a suction opening on a front end. The housing of the dust collector internally includes an air passage where air suctioned from the suction opening passes through the ventilation member to reach a discharge port disposed on the housing of the dust collector, and a filter is housed in the air passage to capture dust in the air. The ventilation member includes a guide rail disposed on one side surface to be fitted to a fitting portion disposed on the housing, and a depressed portion disposed on the other side surface to be fitted to a convex portion disposed on the housing, thus ensuring its slidability. A retreated position of the ventilation member can be changed by adjusting a position of an adjusting member that engages with a rack on a side surface of the ventilation member.

According to the above-described conventional dust collector for the electric power tool, the fitting portion and the convex portion (a guiding portion), and the guide rail and the depressed portion (a guided portion) are disposed on both right and left sides of the ventilation member (sliding portion). Then, a dimension increases in a right-left direction, thus causing poor operability at a narrow position. When the dust collector for the electric power tool is transversely placed, the adjusting member and the guide rail, which are exposed to side surfaces, abut on a floor surface or the like, so as to be possibly damaged. Furthermore, since the guiding portion and the guided portion are arranged at positions apart from one another on right and left of the sliding portion, it is less likely to provide accuracy in the right-left direction, thus causing a tangle and a looseness to decrease slidability in some cases.

Therefore, it is an object of the disclosure to provide a dust collector for an electric power tool having a configuration that is compact and less likely to be damaged to ensure accurately guiding a sliding portion, and to provide an electric power tool.

SUMMARY

In order to achieve the above-described object, there is provided a dust collector for an electric power tool according to a first aspect of the disclosure. The dust collector for the electric power tool includes a main body case, a tubular sliding portion, and a dust collection portion. The main body case is mountable to an electric power tool. The tubular sliding portion is disposed on the main body case. The sliding portion includes a nozzle on a front end thereof. The nozzle includes a suction opening. The dust collection portion is configured to accumulate dust suctioned from the nozzle. The sliding portion includes a guided portion supported by a guiding portion disposed on the main body case. The guided portion is supported slidably in a front-rear direction, and the guiding portion and the guided portion are disposed in a region on a half side with respect to a line on a cross section passing through a center of the sliding portion.

Preferably, the guided portion is a rail-shaped protrusion projecting from the sliding portion, and the protrusion includes guided surfaces in four directions viewed on a cross section perpendicular to the sliding direction.

Preferably, the guiding portion is made of metal.

Preferably, the sliding portion is located on the main body case such that the sliding portion comes on a position displaced to any of right and left sides from just below a tool bit of the electric power tool in a state where the main body case is installed on the electric power tool, the protrusion is disposed below the sliding portion, and the guiding portion and the protrusion are located within a region in a lower side with respect to a center of the sliding portion.

Preferably, the sliding portion is located on the main body case such that the sliding portion comes on a position just below a tool bit of the electric power tool in a state where the main body case is installed on the electric power tool, the protrusion is disposed on a position displaced to any of right and left sides from just below the sliding portion, and the guiding portion and the protrusion are located within a region in any one of right and left sides with respect to a center of the sliding portion.

Preferably, the sliding portion has a telescope structure that includes a plurality of tubular bodies and is configured to expand and contract.

Preferably, the main body case includes a spiral spring configured to projectingly bias the sliding portion forward, and the spiral spring is coupled to the sliding portion passing between the guiding portion and the guided portion.

Preferably, the sliding portion has a telescope structure constituted of a plurality of tubular bodies having a diameter increasing forward in stages.

Preferably, a slide bar is coupled to the tubular body on a frontmost position parallel to the tubular body, and the slide bar is supported by the main body case slidably in the front-rear direction.

Preferably, the sliding portion includes three of the tubular bodies and slides in two stages.

Preferably, the sliding portion is located on the main body case such that the sliding portion comes on a position displaced to any of right and left sides from just below a tool bit of the electric power tool in a state where the main body case is installed on the electric power tool.

Preferably, the main body case includes an exhaust outlet, the dust collection portion is a dust box disposed on the main body case to internally include a filter, a dust collecting route that passes through the filter from the suction opening to reach the exhaust outlet is provided, the dust collecting route includes a flow path outlet that projects into the dust box in an upstream side of the filter, and the flow path outlet is formed in a tapered shape toward a projection direction.

Preferably, the flow path outlet has a tubular shape.

Preferably, the flow path outlet has a projection length equal to or more than 1/3 of a depth of the dust box in the projection direction.

Preferably, the dust box has a part ahead of the flow path outlet in the projection direction as a guide unit configured to change a direction of air discharged from the flow path outlet.

Preferably, the dust box includes a box main body where dust accumulates and a lid body configured to open and close the box main body, and the flow path outlet is disposed on the lid body.

Preferably, the box main body and the lid body are connected by hinge connection, and the flow path outlet has at least a surface positioned on an opposite side of the hinge connection as an inclined surface forming the tapered shape.

An electric power tool to achieve the above object is configured to mount the dust collector for the electric power tool according to any one of the above aspects.

According to the disclosure, the sliding portion can be guided by only the guided portion within the region on a half side of the sliding portion, thus causing the guide structure to be compact so as to provide an excellent operability in the narrow space. The guided portion is less likely to be exposed, thus reducing the possibility of being damaged. Furthermore, the guided portion is guided in the narrow region, thus reducing the occurrence of the tangle and the looseness. Therefore, the sliding portion is guided accurately while the slidability is maintained.

The sliding portion can be smoothly guided by the guided surfaces in the four directions without rattling, thus providing the excellent accuracy of guiding.

The metallic guiding portion ensures the strength.

The guiding portion and the protrusion are located within the region in the lower half side of the sliding portion. Therefore, the guiding portion and the protrusion are prevented from being exposed from the sliding portion in plan view, thus reducing the damage from especially the upper side.

The guiding portion and the protrusion are located within the region in one of right and left sides of the sliding portion. Therefore, the guiding portion and the protrusion are prevented from being exposed from the sliding portion in side view, thus reducing the damage from especially the side.

The sliding portion has the telescope structure, thus achieving smoother slide to back and forth.

The spiral spring is coupled to the sliding portion passing between the guiding portion and the guided portion, thus ensuring coupling the spiral spring to the sliding portion with a small space.

The sliding portion has the telescope structure having the large diameter in the front side, which causes the tubular body at the rearmost position to have the minimum diameter, thus providing the sliding portion with the compact structure without upsizing the main body case.

The slide bar supported by the main body case slidably in the front-rear direction is coupled to the tubular body at the frontmost position in parallel. Then, even with the telescope structure having the large diameter in the front side, the tubular body at the frontmost position is smoothly slid using the one slide bar. The slide bar does not interfere with the main body case and the electric power tool, thus ensuring a required slide stroke even in a small model.

The sliding portion includes three tubular bodies and slides in two stages, which allows the maximum stroke to be increased. Therefore, what is called a long bit having a long whole length is supported.

The sliding portion is shifted to any of right and left sides from just below the tool bit. Therefore, the sliding portion expands and contracts without interfering with the main body case even if the slide bar is not used.

The flow path outlet included in the dust collecting route to project into the dust box is formed in the tapered shape toward the projection direction. Therefore, the decrease of the flow rate at the flow path outlet is reduced to maintain the dust collection efficiency even if the amount of the dust in the dust box increases and the flow amount of the air decrease.

The flow path outlet in the tubular shape reduces the obstruction by the dust even if the flow path outlet is put upward in the work, thus ensuring the dust collection efficiency.

The flow path outlet has the projection length equal to or more than 1/3 of the depth of the dust box in the projection direction, thus ensuring the flow path outlet to have the preferred length that reduces the obstruction by the dust.

The part ahead of the flow path outlet in the projection direction in the dust box is formed as the guide unit that changes the direction of the air, thus reducing the rebound of the dust to smoothly guide downstream even if the flow path outlet is projected into the dust box.

The dust box includes the box main body where the dust accumulates and the lid body configured to open and close the box main body, and the flow path outlet is disposed on the lid body. Then, the flow path outlet can be surely projected at the proper position inside the box main body simultaneously with the close of the box main body by the lid body.

The box main body and the lid body are connected by the hinge connection, and the flow path outlet has the surface positioned on the opposite side of the hinge connection as the inclined surface forming the tapered shape. Thus, while throttling the flow path area of the flow path outlet, the inclined surface can be used as the escaping portion that prevents the flow path outlet from interfering with the box main body in open and close of the hinge connected lid body.

BRIEF DESCRIPTION OF THE DRAWINGS

FIG. 15A is a perspective view from a front and FIG. 15B is a perspective view from a rear.

FIGS. 16A and 16B are explanatory views of the dust box, and FIG. 16A illustrates a back surface and FIG. 16B illustrates a cross section taken along the line D-D in FIG. 16A.

FIG. 18A is a perspective view from a left front side and FIG. 18B is perspective view from a right front side.

DETAILED DESCRIPTION

The following describes embodiments of the disclosure based on the drawings.

Figure 1:
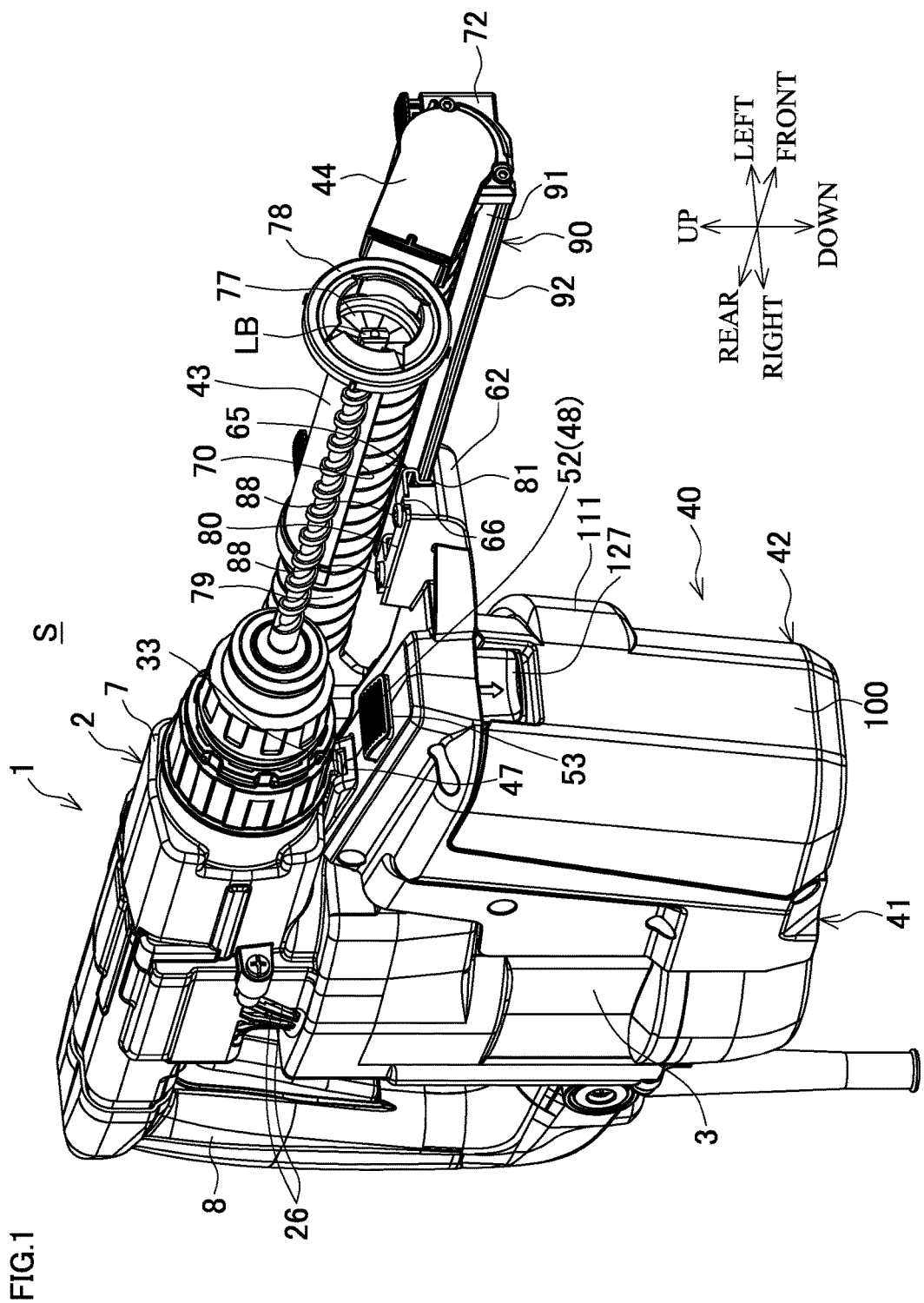
FIG. 1 is a perspective view illustrating a dust collection system from a front.
Figure 2:
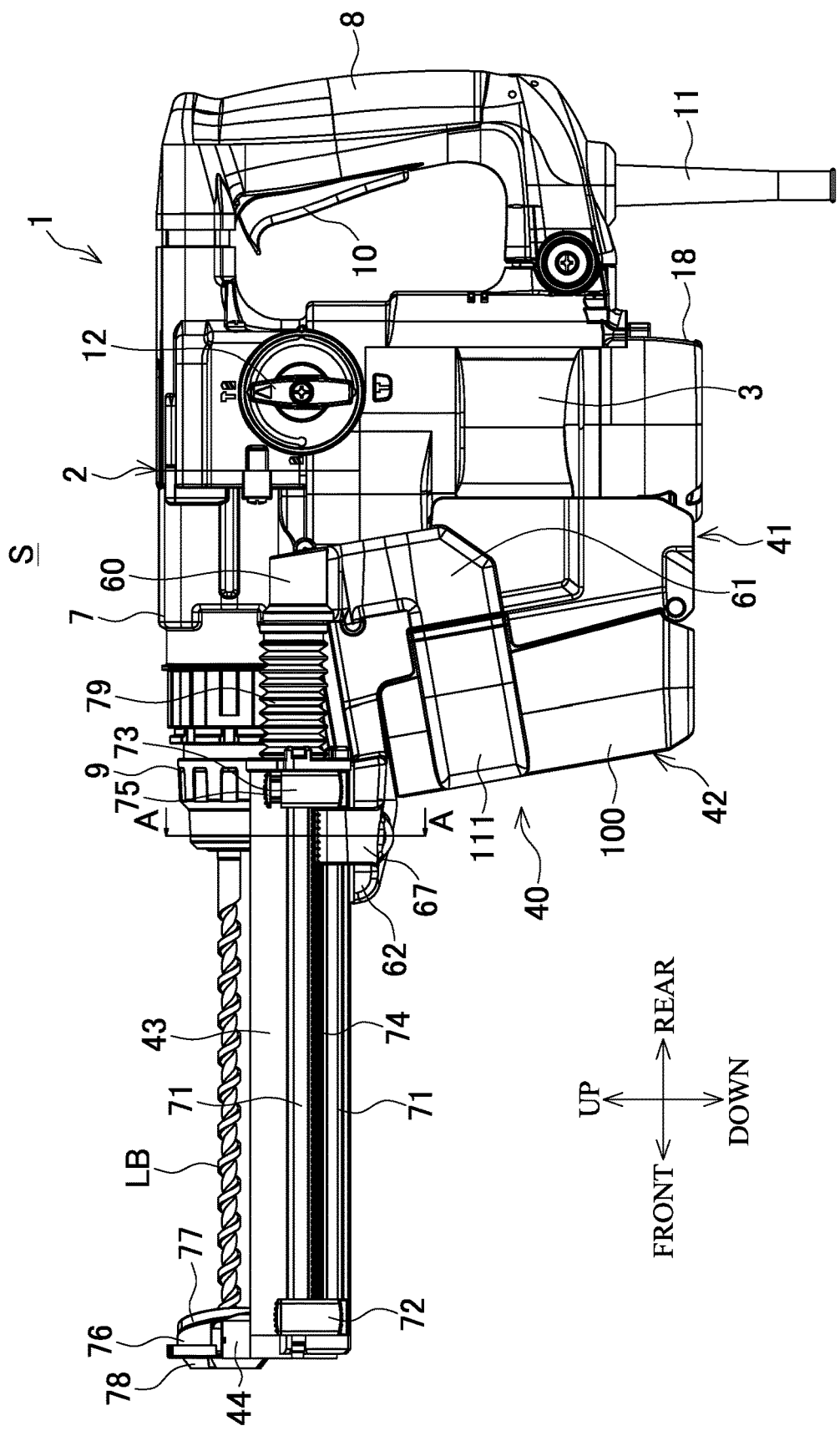
FIG. 2 is a side view of the dust collection system.
Figure 3:
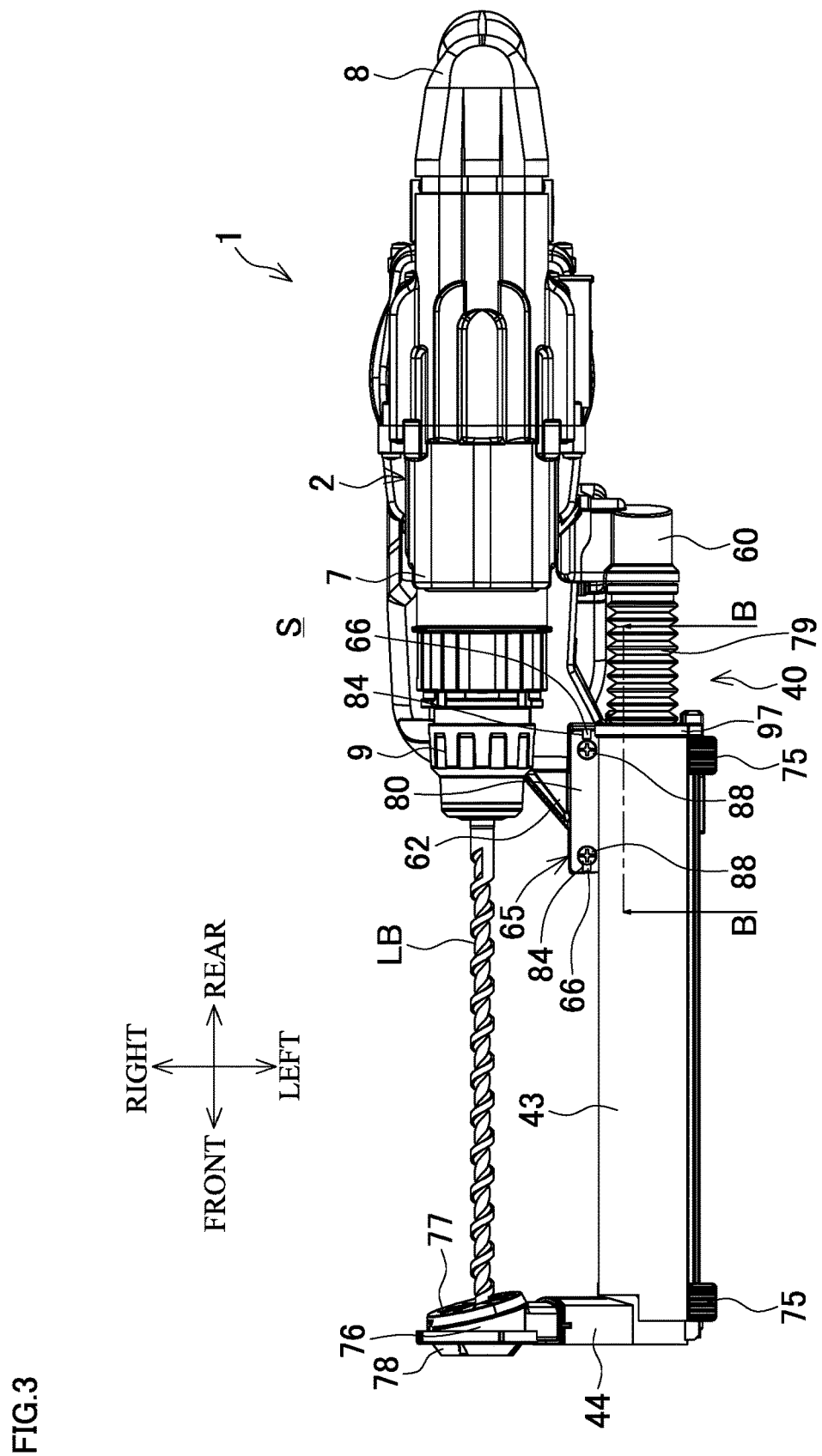
FIG. 3 is a plan view of the dust collection system.
Figure 4:
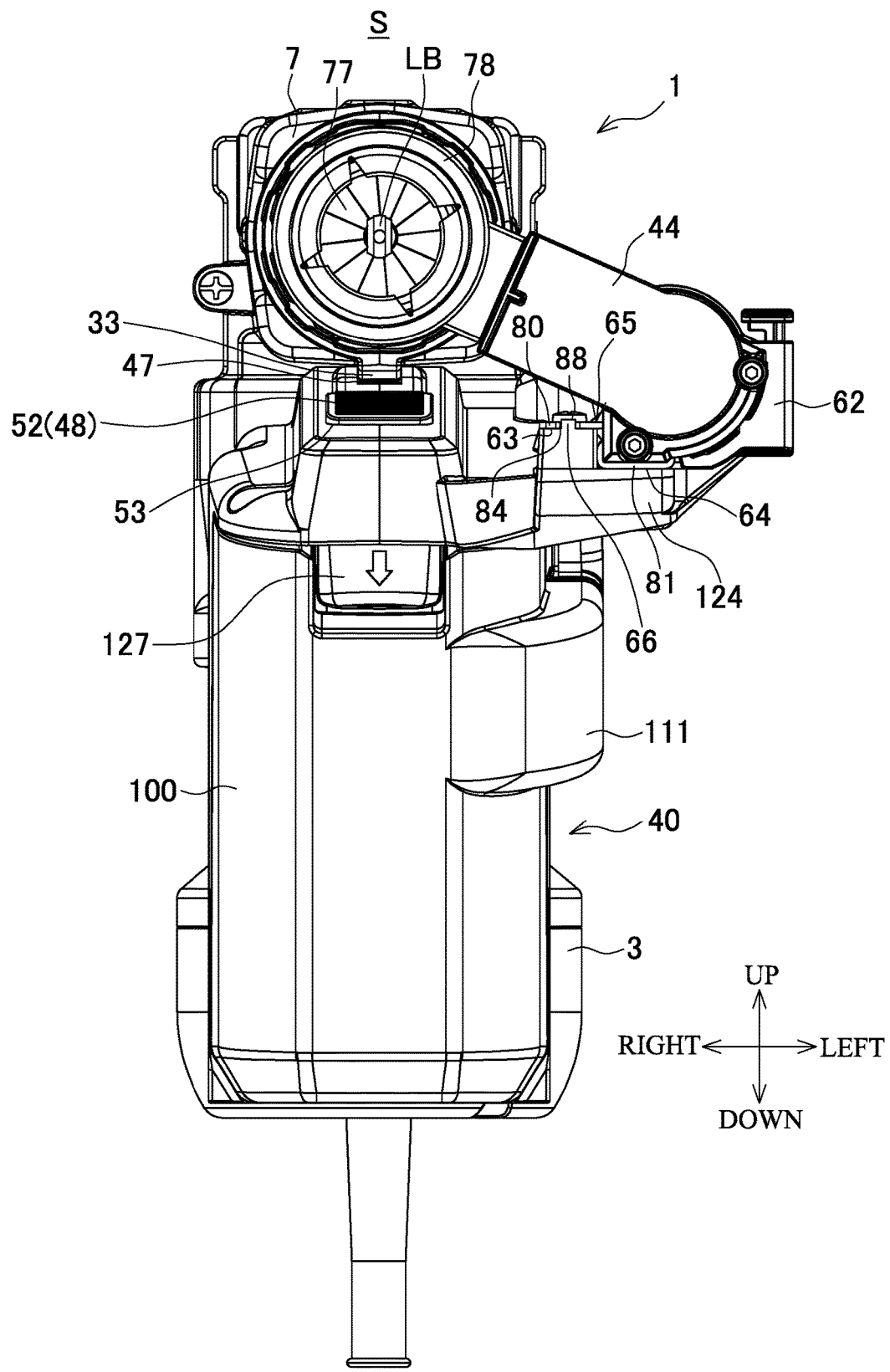
FIG. 4 is a front view of the dust collection system.

FIGS. 1 to 4 illustrate an exemplary dust collection system S where a dust collector for an electric power tool (hereinafter simply referred to as "a dust collector") 40 is installed on a hammer drill 1 as an electric power tool. FIG. 1 is a perspective view from a front, FIG. 2 is a side view, FIG. 3 is a plan view, and FIG. 4 is a front view.

Figure 5:
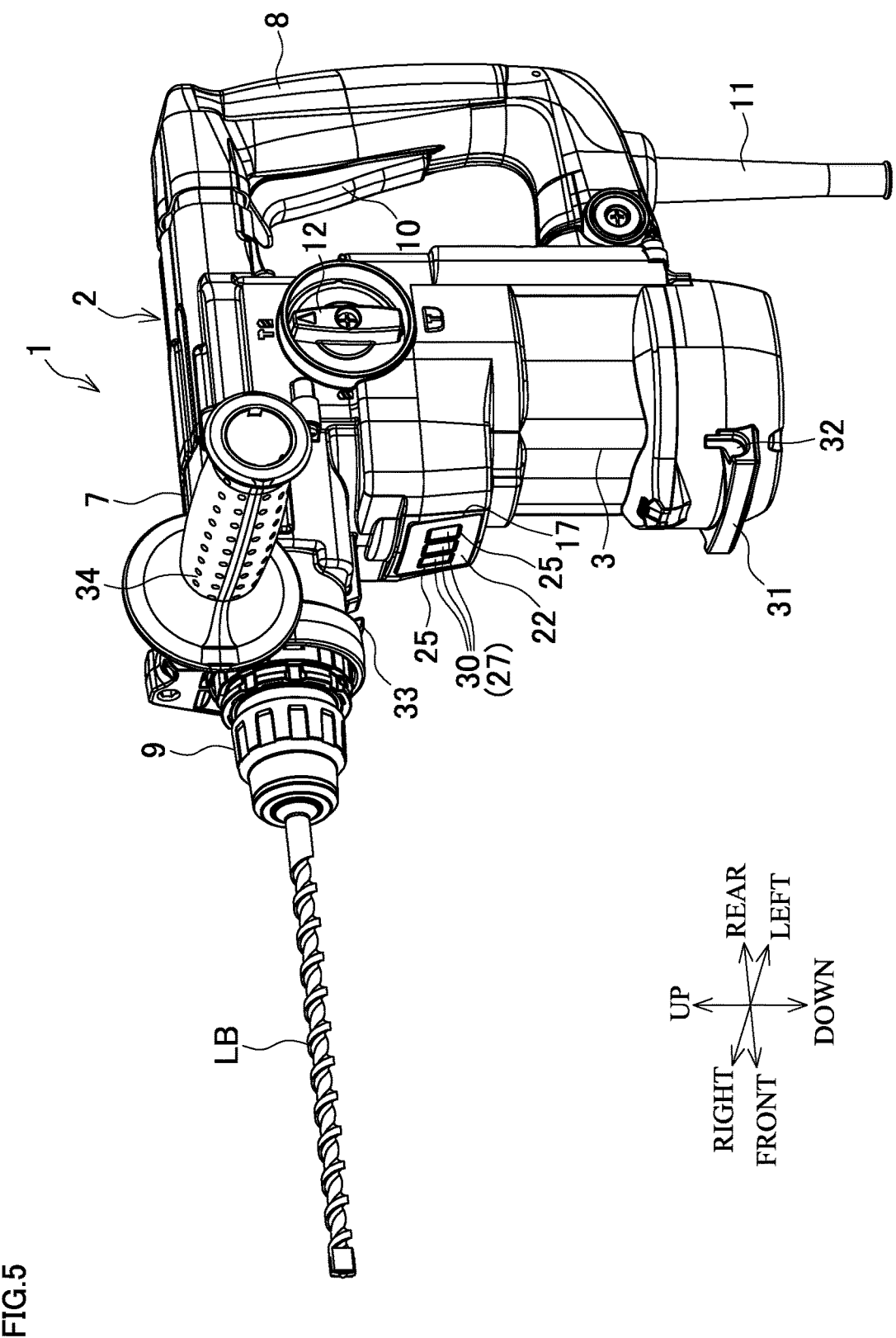
FIG. 5 is a perspective view of a hammer drill.
Figure 8:
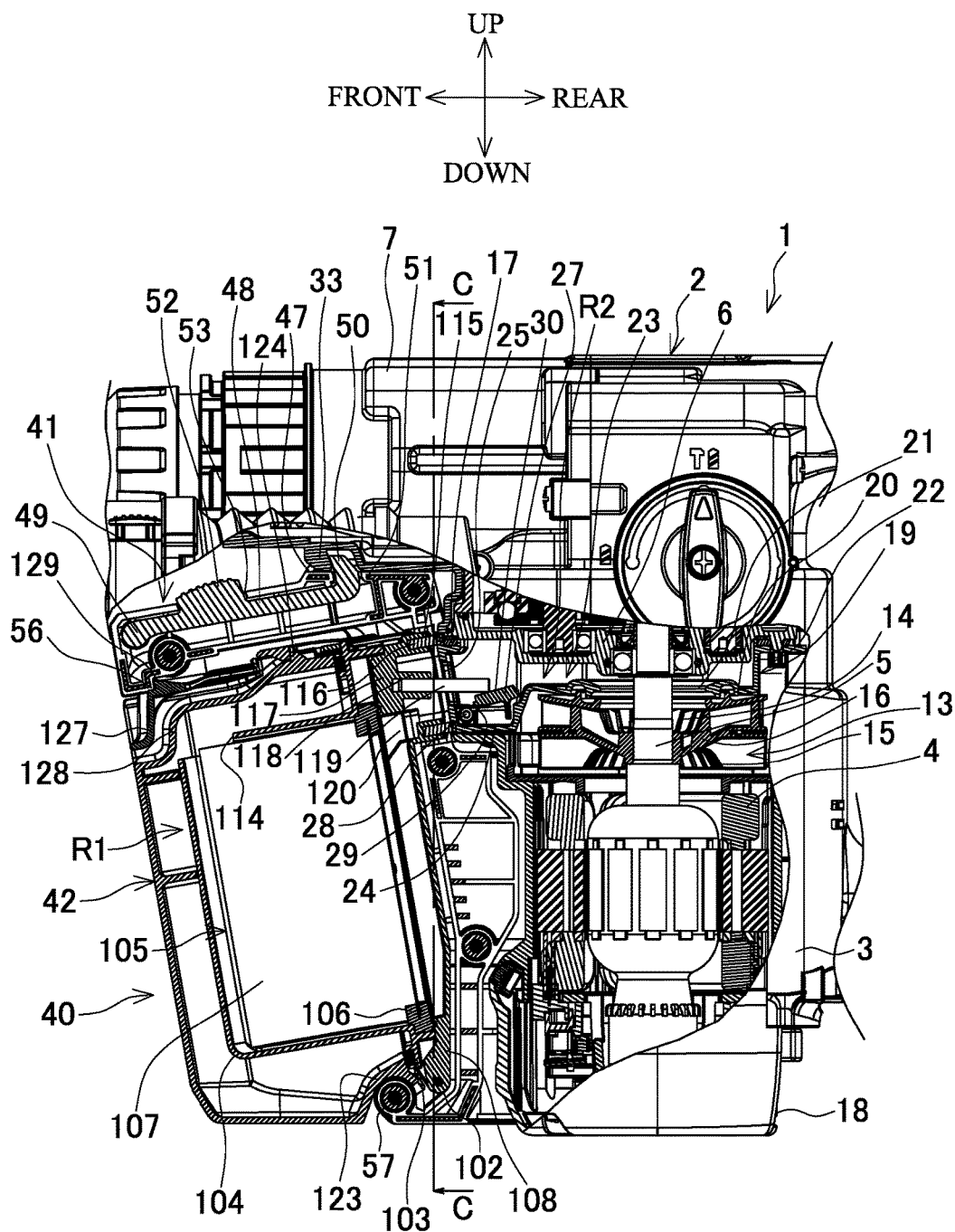
FIG. 8 is a partial cross-sectional view of a joining part of a dust collector for an electric power tool.

As also illustrated in FIG. 5 and FIG. 8, the hammer drill 1 internally includes a motor housing 3, which houses a motor 4 with an output shaft 5 disposed upward, in a vertical direction on a front lower portion of a main body housing 2. Above the motor housing 3, the hammer drill 1 internally includes a gear housing 6 that houses a crank mechanism and a rotation mechanism. The hammer drill 1 includes a front housing 7, which houses a tool holder disposed forward, assembled on the front of the main body housing 2, and includes a handle housing 8, which has an U-shape from the side view, coupled to the rear portion of the main body housing 2. The tool holder has a distal end on which a tool bit (in FIGS. 1 to 4, indicated as a drill bit, hereinafter referred to as a "long bit LB," corresponding to a maximum drilling depth of 120 mm or more) is configured to be installed by an operation sleeve 9. The hammer drill 1 includes a switch lever 10, which is disposed on a switch included in the handle housing 8, and a power supply cord 11.

The tool holder includes a hammering mechanism where a piston is reciprocated by a connecting rod of the crank mechanism. The main body housing 2 includes a change lever 12 on a side surface, and the hammer drill 1 is configured to select a mode among a hammer mode in which the hammering mechanism is operated to provide a hammering on the tool bit, a drill mode in which the rotation mechanism is operated to rotate the tool bit with the tool holder, and a hammer drill mode in which the hammering mechanism and the rotation mechanism are simultaneously operated to provide the hammering and the rotation on the tool bit, with use of the change lever 12.

In the motor housing 3, as illustrated in FIG. 8, the output shaft 5 of the motor 4 passes through the gear housing 6 to engage with a gear (not illustrated) of the crank mechanism. The gear housing 6 includes a fan housing chamber 13 on a lower portion. In the fan housing chamber 13, an upper fan 14 and a lower fan 15, which are each a centrifugal fan, are disposed on the upper and the lower of the output shaft 5 via a partition board 16. The main body housing 2 has a front surface on which an opening 17 communicated with the fan housing chamber 13 is disposed, and the motor housing 3 has a lower back surface on which a lower inlet 18 is disposed.

The fan housing chamber 13 internally includes a plate member 19, which is constituted of a lower plate 20 and a peripheral plate 22, upward the upper fan 14. The lower plate 20 has a through hole 21 for the output shaft 5, extends from the upward of the upper fan 14 to the front surface of the main body housing 2, and is small by one size in size of right to left and the rear part compared with the fan housing chamber 13. The peripheral plate 22 is disposed upright on the outer periphery of the lower plate 20 to obstruct between the gear housing 6 and the lower plate 20. The plate member 19 communicates with the upper fan 14 to divide the inside of the fan housing chamber 13, thus forming a separation chamber 23. The lower plate 20 of the plate member 19 has a front portion that depresses downward by one step inside the front portion of the main body housing 2 to form a deep bottom portion 24. The peripheral plate 22 also extends downward with the deep bottom portion 24 to reach the front surface of the main body housing 2, so as to obstruct the opening 17. On the obstructed part of the front surface, three upper inlets 25, 25 . . . , which are small by one size compared with the opening 17 and has a vertically elongated rectangular shape, are disposed alongside in the right-left direction. On a right side surface of the main body housing 2, power-tool-side exhaust ports 26, 26, which are communicated with the fan housing chamber 13 passing between the main body housing 2 and the gear housing 6, are disposed.

The deep bottom portion 24 houses a shutter member 27 on rearward the upper inlets 25. The shutter member 27 has a lower end rotatably supported by a pin 28 in the right-left direction. The shutter member 27 is biased to a forward standing position by a torsion spring 29, which is wound around the pin 28 to lock to the deep bottom portion 24 and the shutter member 27, in an ordinary state. On a front surface of the shutter member 27 at the standing position, three fitting convex portions 30, 30 . . . are disposed to protrude such that the fitting convex portions 30, 30 . . . engage with the respective upper inlets 25 to obstruct the respective upper inlets 25.

Furthermore, on a bottom of the front surface of the main body housing 2, a receiving flange 31 and lower cutouts 32, 32 are disposed. The receiving flange 31 is disposed to protrude along a front peripheral surface of the main body housing 2. The lower cutouts 32, 32 are formed in semicircular shapes, symmetrically disposed on right and left of the receiving flange 31, and open upward and laterally outward. The front housing 7 has a lower surface on which a stop 33 is disposed to project downwardly rearward, and the front housing 7 is configured to mount a side handlebar 34.

Figure 9:
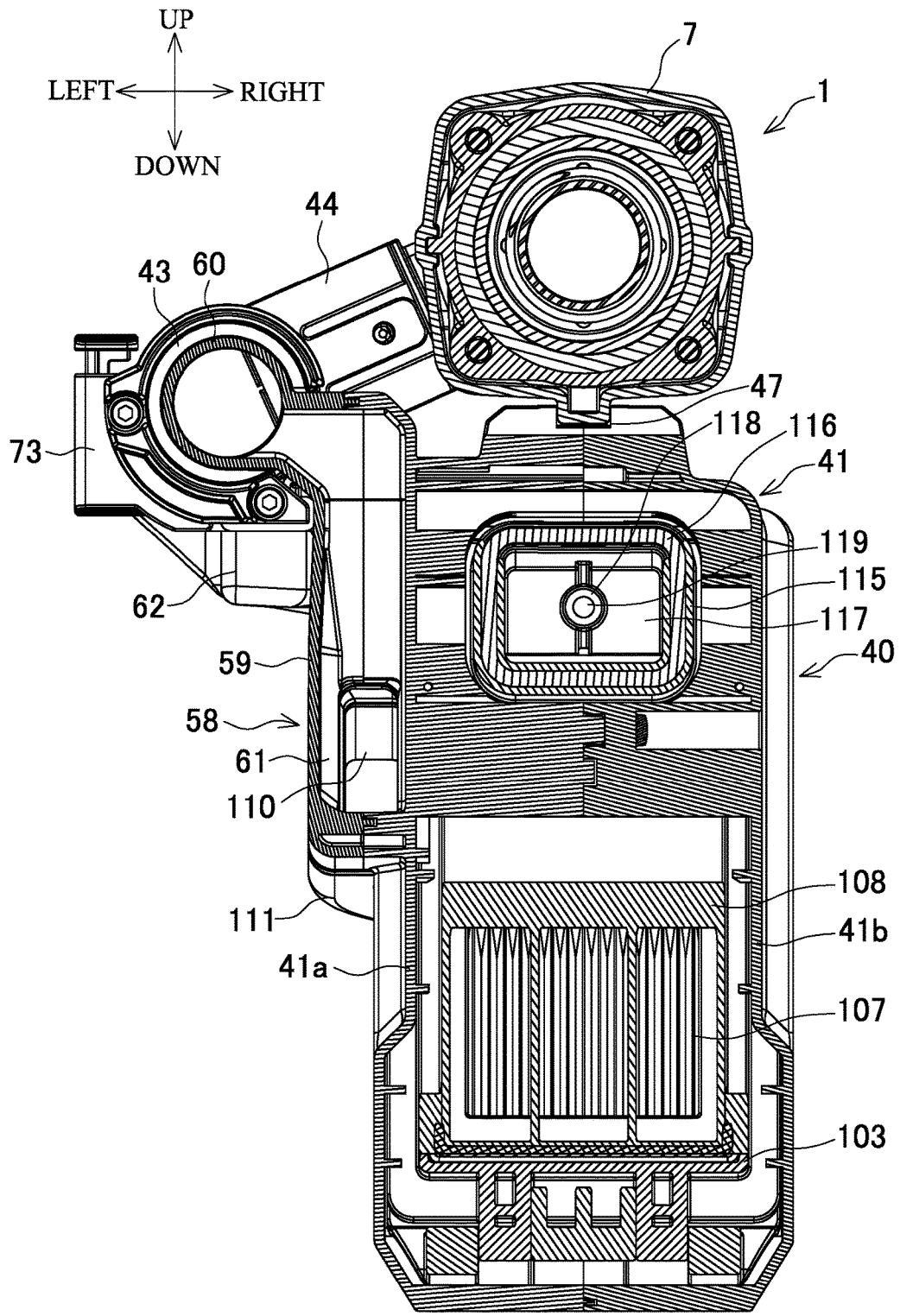
FIG. 9 is a cross-sectional view taken along the line C-C in FIG. 8.
Figure 10:
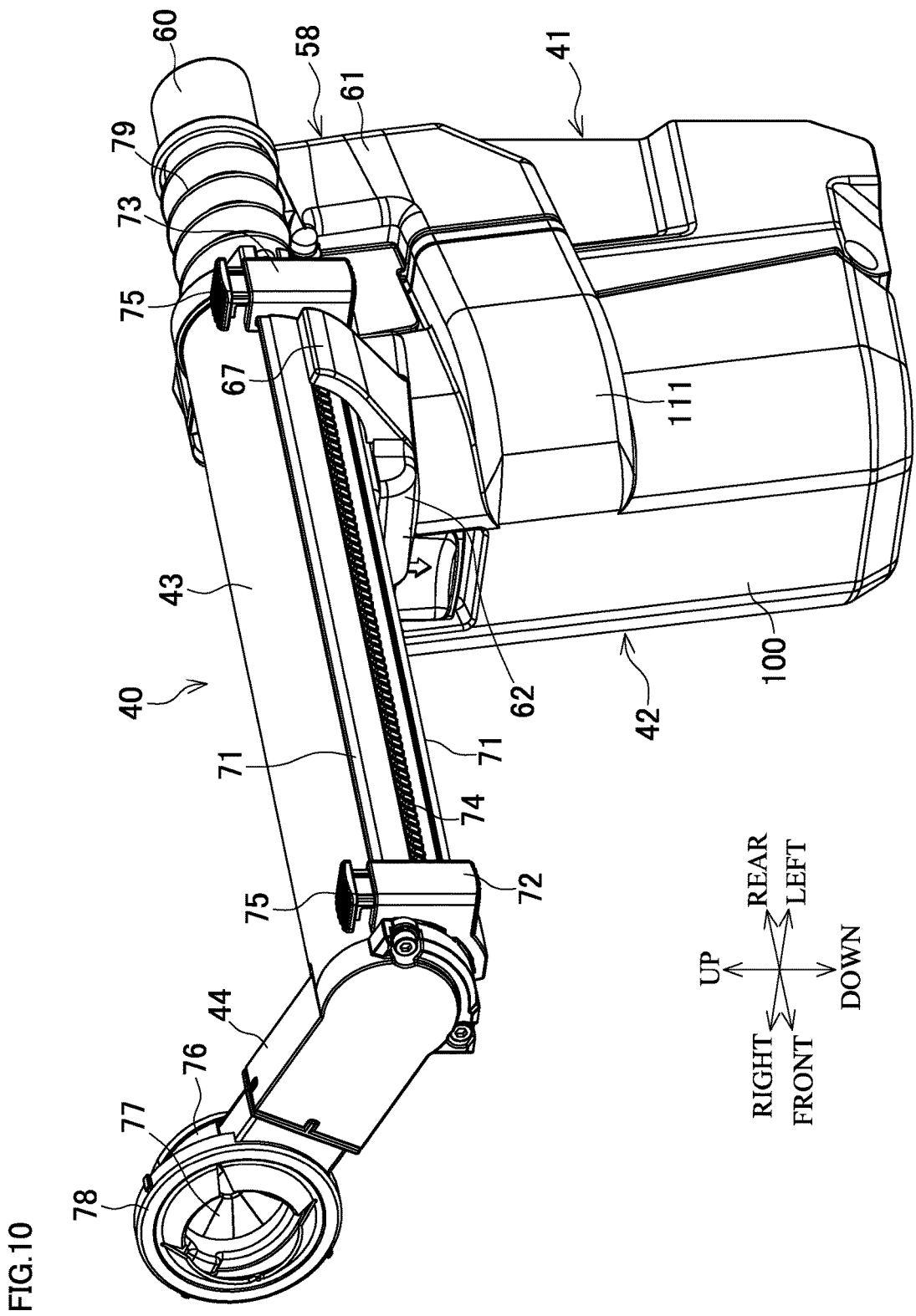
FIG. 10 is a perspective view illustrating the dust collector for the electric power tool from a front.
Figure 11:
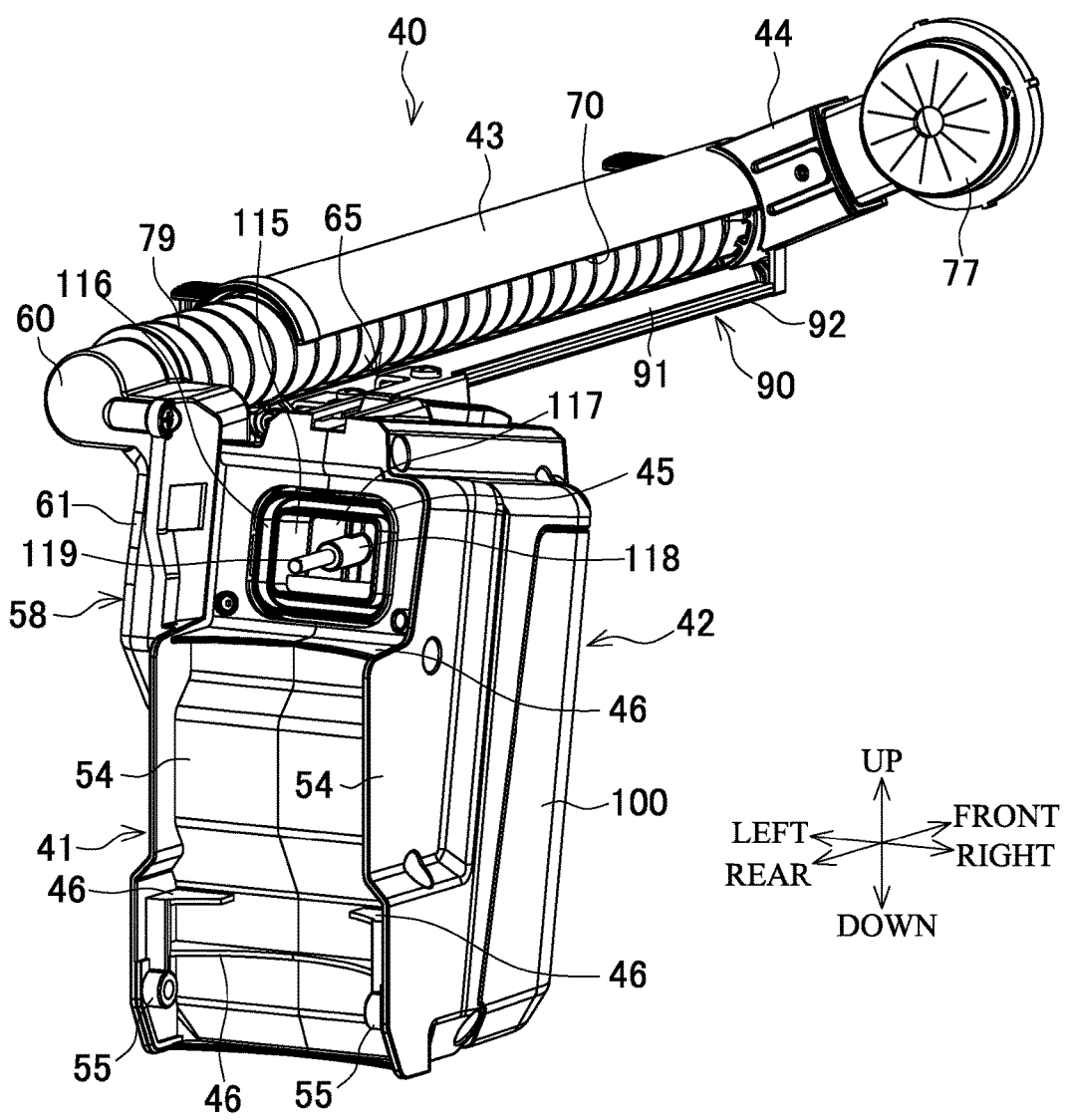
FIG. 11 is a perspective view illustrating the dust collector for the electric power tool from a rear.

As illustrated in FIGS. 9 to 11, the dust collector 40 is constituted of a main body case 41 installed on the hammer drill 1, a dust box 42 removably installed on the main body case 41, and a sliding portion 43 that is coupled to the main body case 41 and has a distal end on which a nozzle 44 is disposed.

Figure 12:
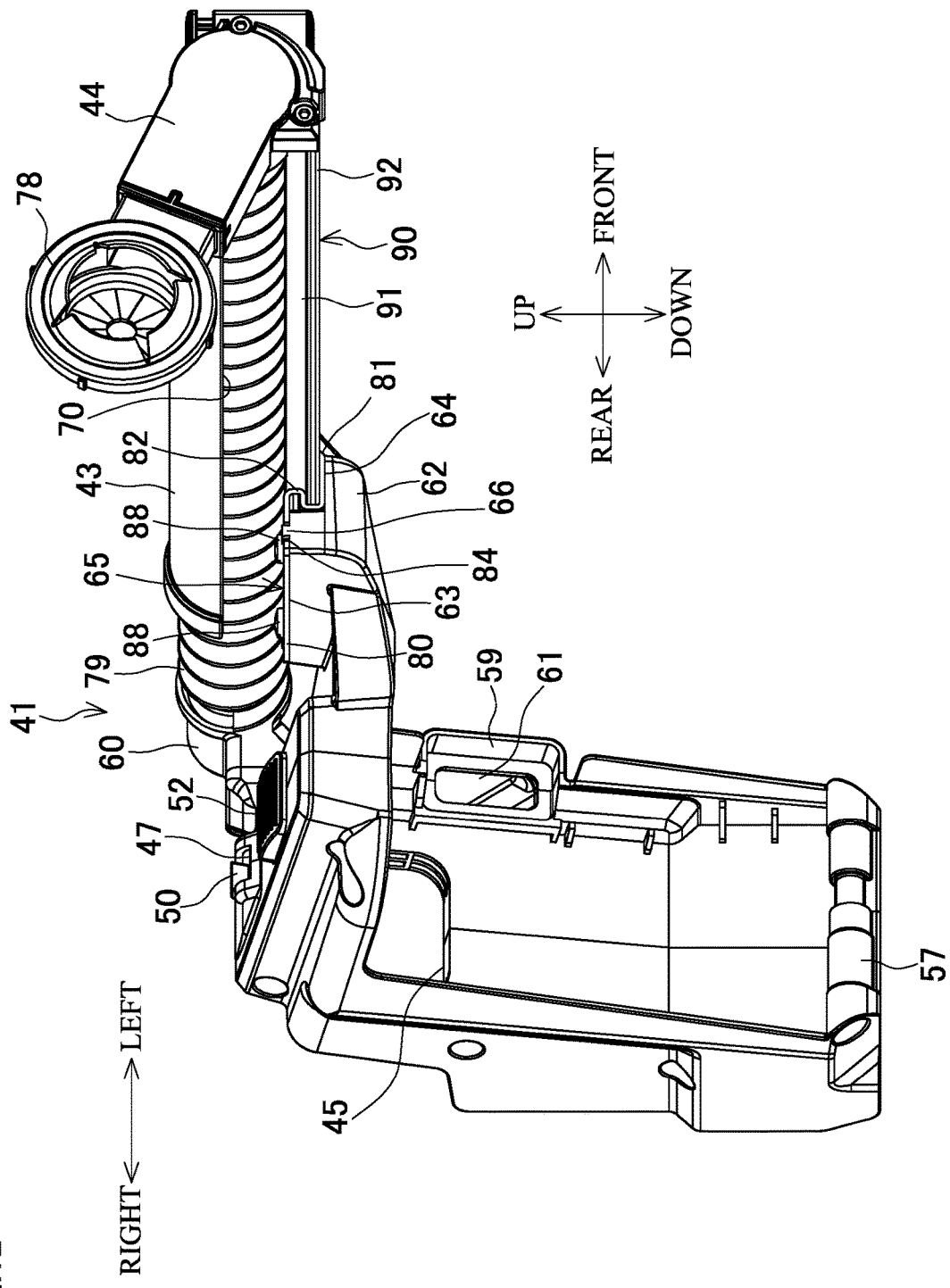
FIG. 12 is a perspective view illustrating a main body case from a front.
Figure 13:
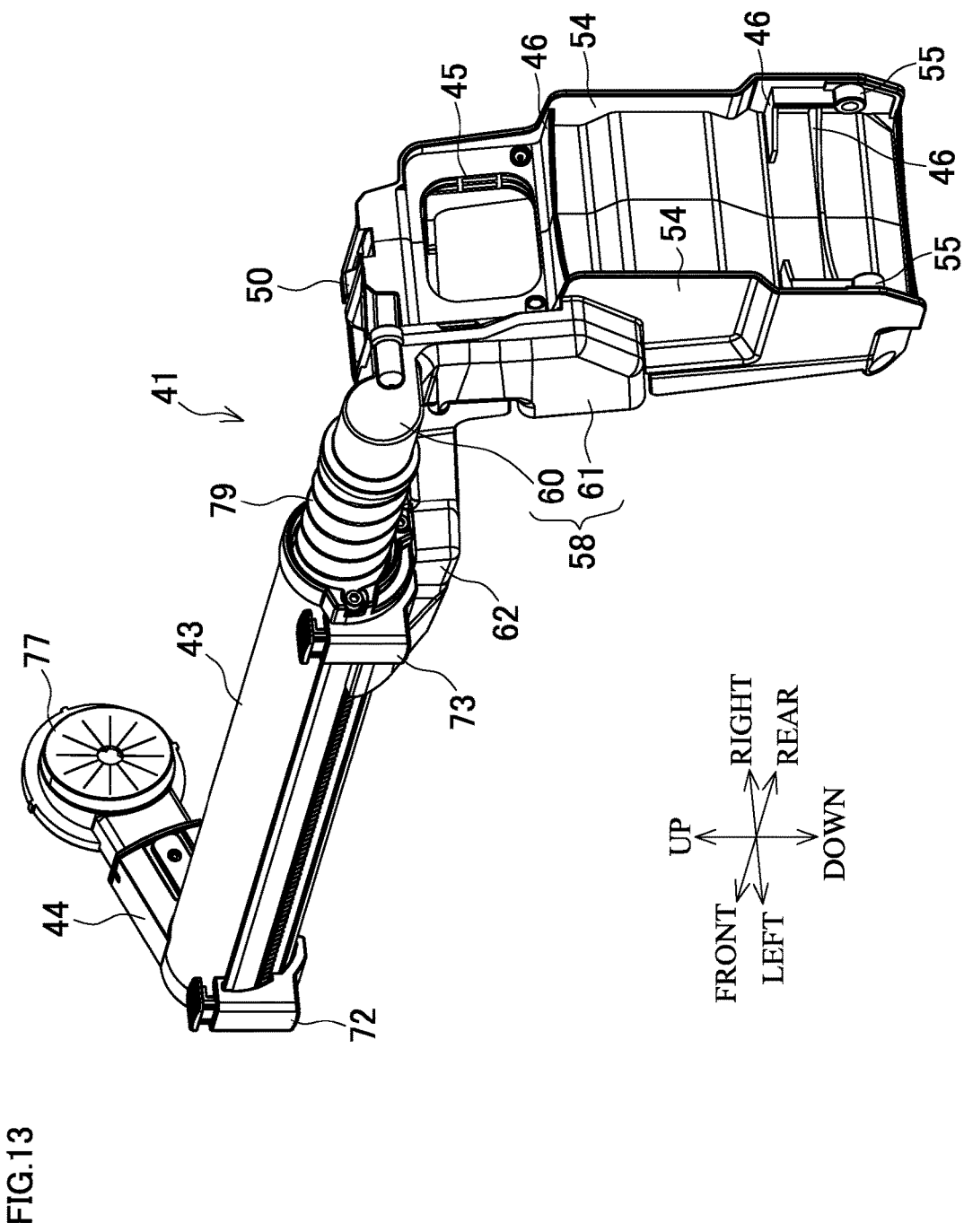
FIG. 13 is a perspective view illustrating the main body case from a rear.

First, the main body case 41 is formed to combine right and left half cases 41a and 41b, and is a vertically elongated box-shaped body that has a front surface as a surface to be coupled to the dust box 42 and a rear surface as a surface to be mounted to the hammer drill 1. As illustrated in FIGS. 12 and 13, a square hole 45 is formed to pass through the main body case 41 on a position corresponding to the upper inlets 25 of the hammer drill 1. Below the square hole 45 on the rear surface of the main body case 41, a plurality of abutting ribs 46, 46 . . . are disposed along a front surface shape of the motor housing 3 of the hammer drill 1, and formed to abut on a front surface of the motor housing 3 in a state of being mounted to the motor housing 3.

Furthermore, the main body case 41 has a top surface on which a guide groove 47 is depressed in a front-rear direction to receive the stop 33 in mounting to the hammer drill 1, and below the guide groove 47 inside the main body case 41, a swing plate 48 is disposed sideways.

As illustrated in FIG. 8, the swing plate 48 is supported by a shaft 49, which is disposed on the front end in the right-left direction, swingably to the upper and lower. A hook 50 is disposed upward on the rear end of the swing plate 48 on the center in the right-left direction so as to be configured to appear in the guide groove 47 via a penetration hole 51 disposed on the main body case 41. The swing plate 48 is biased to an upward position where the hook 50 projects into the guide groove 47 by a torsion spring (not illustrated) disposed on the shaft 49. At the center of a top surface of the swing plate 48, a button 52 is disposed to project to the top surface of the main body case 41 via an opening 53. Accordingly, when a push-in operation on the button 52 is performed to swing the swing plate 48 to a downward position, the hook 50 is retreated downward from the guide groove 47.

Furthermore, the main body case 41 has a rear surface on which lock plates 54, 54 are vertically disposed on both right and left sides so as to be configured to abut on both sides of the front surface of the motor housing 3 of the hammer drill 1. The lock plates 54, 54 have lower portions on which locking shafts 55, 55 are disposed to protrude projecting to facing sides of one another. The abutting ribs 46 are disposed between the lock plates 54, 54, and the locking shafts 55, 55 are configured to lock to the lower cutouts 32, 32 in a state where the abutting ribs 46 at the lowest position are locked to the receiving flange 31.

On the other hand, the main body case 41 includes a locking stepped portion 56, to which an attaching and detaching locking claw 129 of the dust box 42 described later is elastically locked, on the inner surface of the upper side of the front surface side. The main body case 41 includes a shaft portion 57, to which a receiving depressed portion 123 of the dust box 42 is configured to be fitted, on the inner surface of the lower side in the right-left direction.

The main body case 41 includes an intermediate cylinder 58 on the upper side of the left side. As illustrated in FIG. 9, the intermediate cylinder 58 is constituted of the left side half case 41a of the main body case 41 and an outer cover 59 screwed on the half case 41a. The intermediate cylinder 58 includes a receiving cylinder portion 60 and a guide cylinder portion 61. The receiving cylinder portion 60 is disposed on the upper end to open forward and project out to the left side. The guide cylinder portion 61 is disposed downward along the left side of the main body case 41 to communicate with the receiving cylinder portion 60, subsequently folded forward, and open forward at the lower end.

Figure 6:
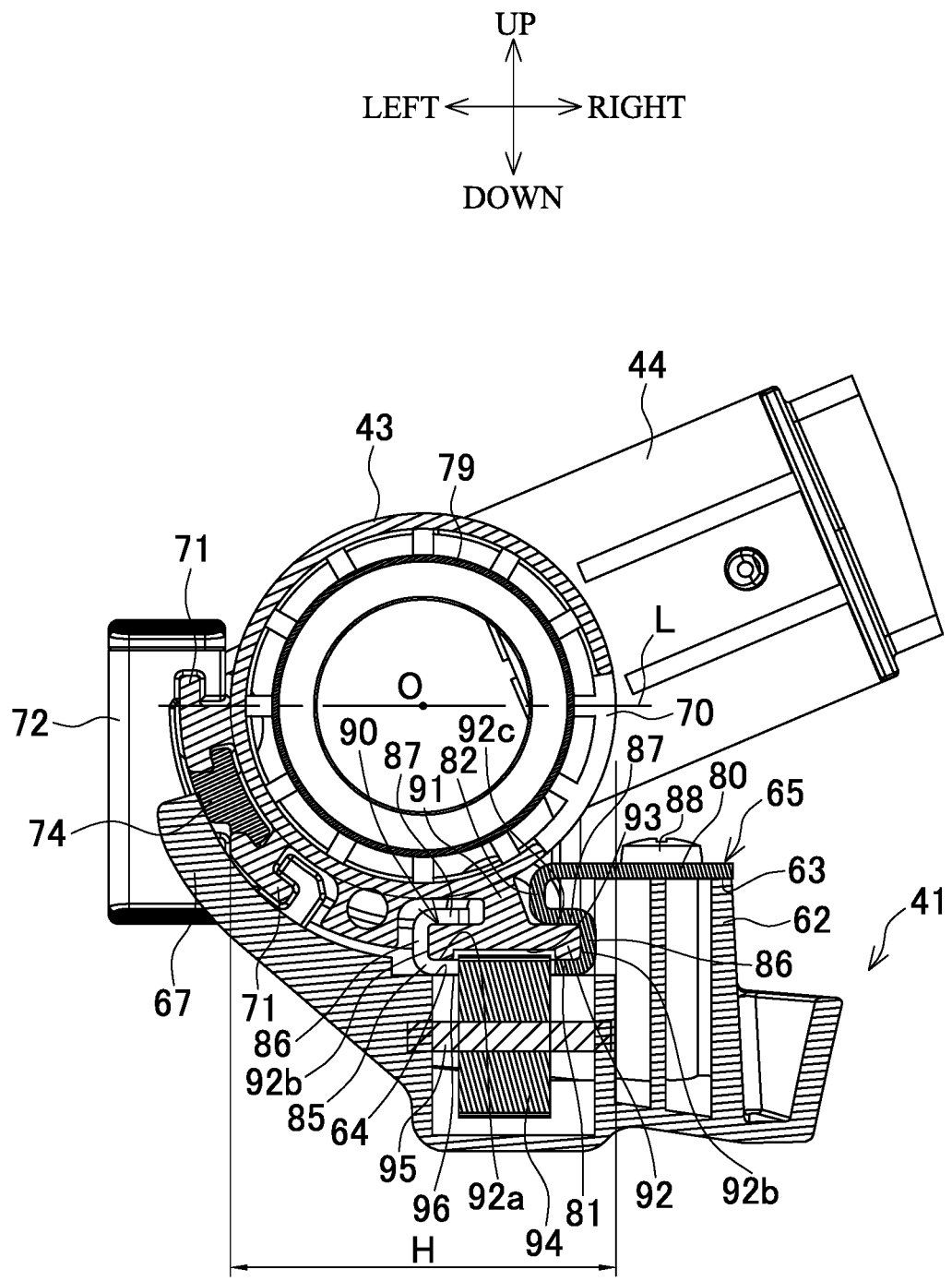
FIG. 6 is a cross-sectional view of a part taken along the line A-A in FIG. 2.

Furthermore, ahead of the intermediate cylinder 58 and on the left upper portion of the main body case 41, a supporting arm 62 is disposed to support the sliding portion 43 from the lower side. The supporting arm 62 projects obliquely forward from the main body case 41, and as illustrated in FIGS. 6 and 12, includes two horizontal upper and lower receiving surfaces, an upper receiving surface 63 on a top surface closer to the main body case 41, and a lower receiving surface 64 outside the upper receiving surface 63. The sliding portion 43 is held slidably to back and forth via a guide metal fitting 65 secured across both receiving surfaces 63 and 64 as described later. The upper receiving surface 63 has front and rear end edges where positioning protrusions 66, 66 for the guide metal fitting 65 are disposed to protrude, and on the left side of the supporting arm 62, an arc-shaped stopper 67 is disposed to protrude going round the sliding portion 43 to the left outer side.

The sliding portion 43 is made of metal such as aluminum and a hollow cylindrical body. The sliding portion 43 includes an elongate hole 70 on a right side surface in the front-rear direction. On a left side surface, two upper and lower rails 71, 71 are disposed parallel over the whole length. A front stopper 72 and a rear stopper 73, which are slidable along the rails 71, 71, are engaged with both rails 71, 71 from the upper and lower sides, so as to be disposed on the front and the rear across the stopper 67 of the supporting arm 62. Between the rails 71, 71, a rack 74 constituted of a plurality of teeth is disposed. The front and rear stoppers 72 and 73 each include a lock button 75 projecting to be biased upward in a state of being engaged with the rack 74. Then, when the lock button 75 is pushed to release the engagement with the rack 74, the front and rear stoppers 72 and 73 become to be slidable along the rails 71, 71, and when the push of the lock button 75 is released, the lock button 75 returns to the position projecting upward to be engaged with the rack 74, thus restricting the slide of the front and rear stoppers 72 and 73.

The nozzle 44 is a cylindrical body that is coupled to the front end of the sliding portion 43 and projects to obliquely upper right side at an approximately right angle from the sliding portion 43. The nozzle 44 has a base end projecting to the inside of the sliding portion 43. On the distal end of the nozzle 44, a ring-shaped suction opening 76 is disposed such that the bit passes through the suction opening 76. The suction opening 76 includes a rear opening to which a rubber cap 77 is fitted, and a front opening to which an obstructing ring 78 is removably fitted. The rubber cap 77 has a plurality of cuts formed radially from a penetration hole on the center. The obstructing ring 78 is made of rubber and obstructs between a surface of a workpiece and the suction opening 76 in a state of being in contact with the surface of the workpiece.

Between the receiving cylinder portion 60 of the intermediate cylinder 58 and the base end of the nozzle 44 in the sliding portion 43, an accordion-shaped flexible hose 79 as a part of a dust collecting route is coupled. The rear end of the sliding portion 43 here is opened, and the rear portion of the flexible hose 79 inside is exposed to be coupled to the receiving cylinder portion 60.

The following describes a guide structure of the sliding portion 43 by the guide metal fitting 65 in detail.

Figure 14:
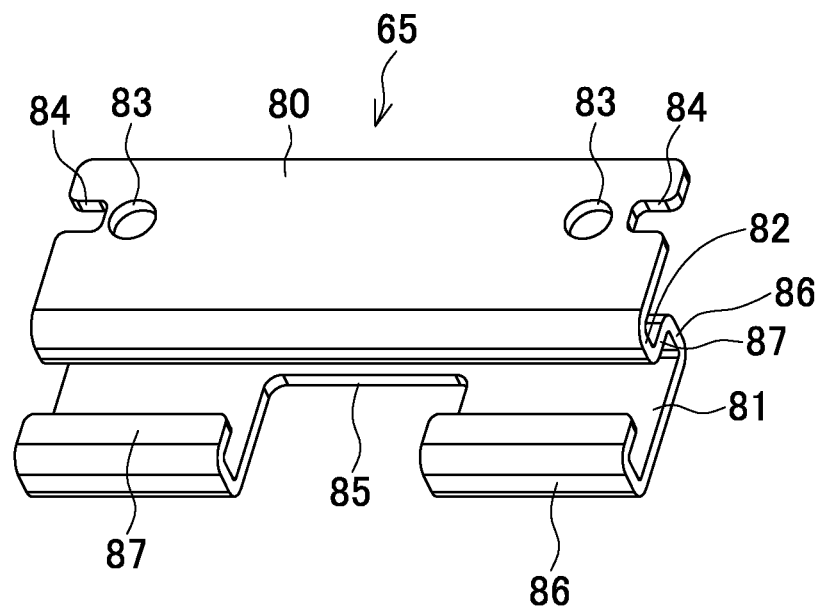
FIG. 14 is a perspective view of a guide metal fitting.
Figure 15A:
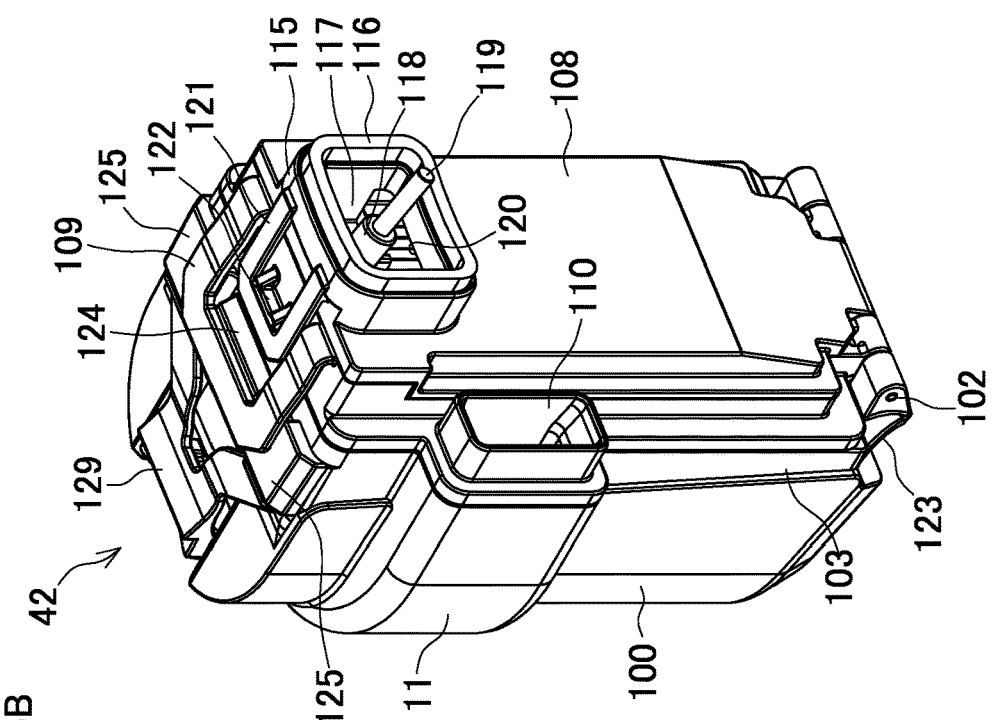
FIGS. 15A and 15B are explanatory views of a dust box.
Figure 15B:
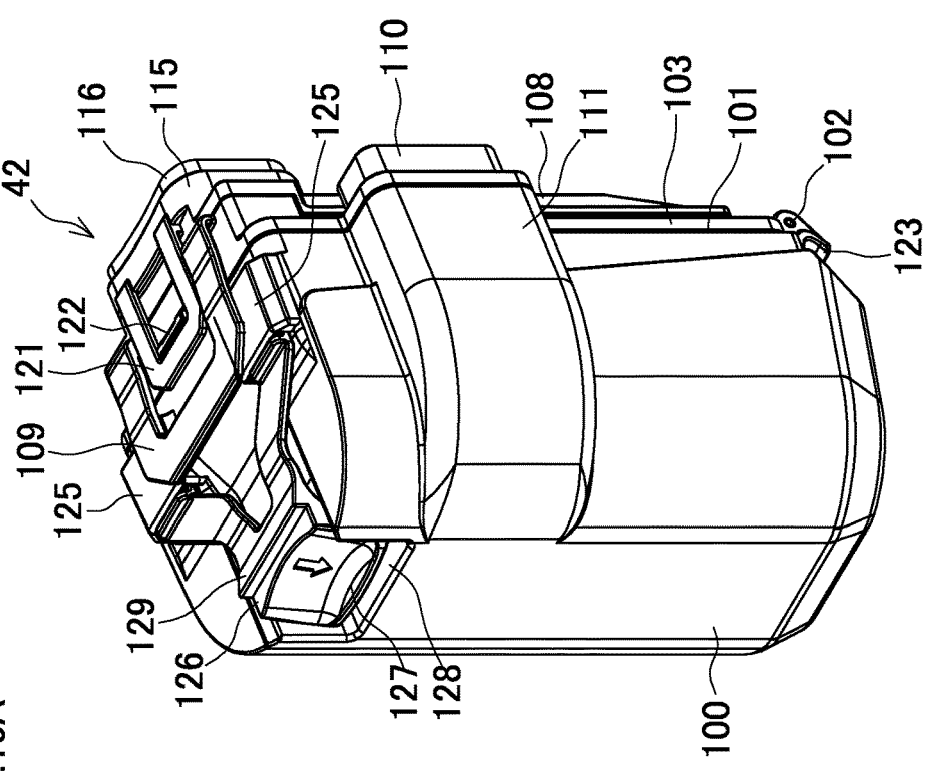
Figure 17:
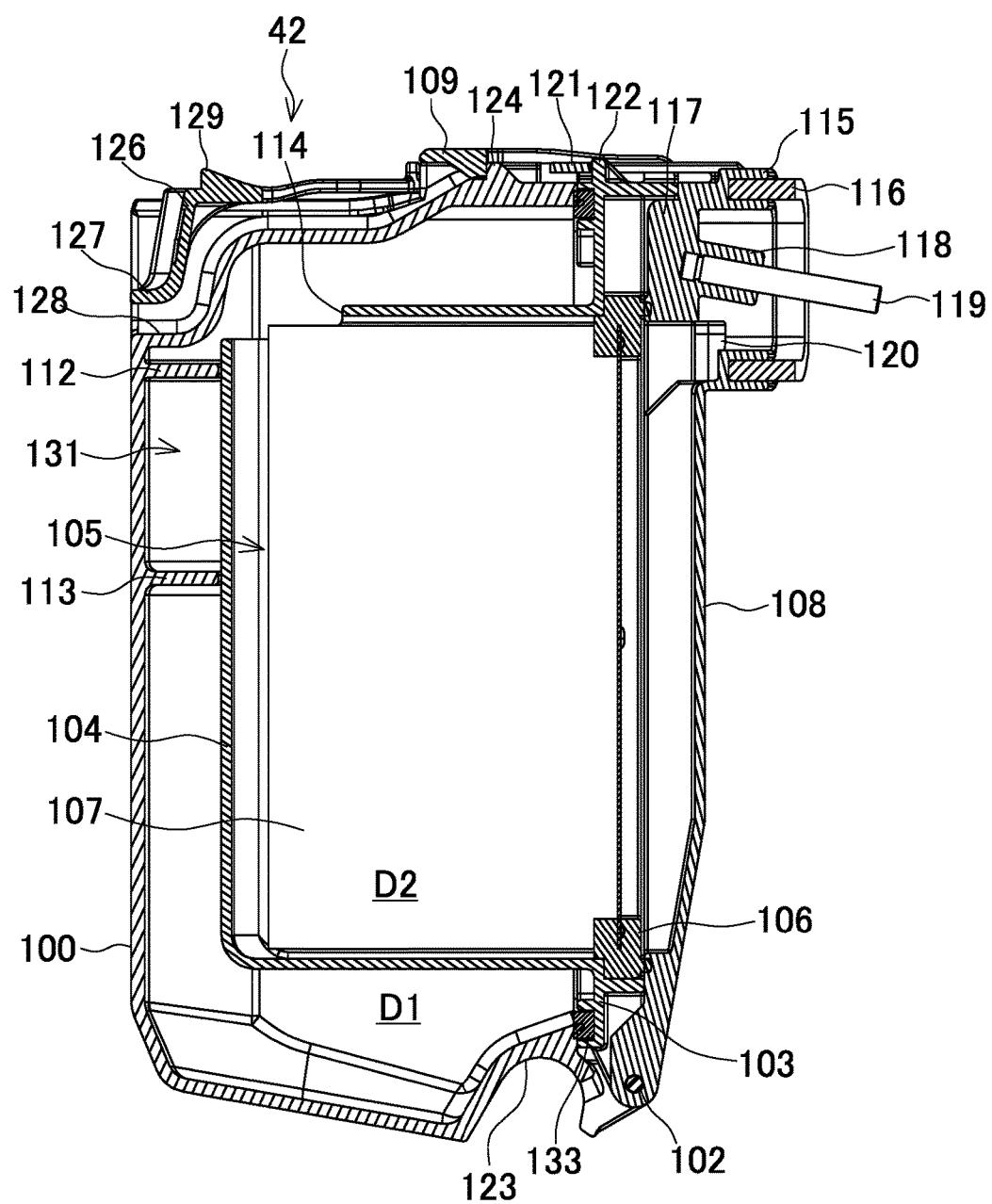
FIG. 17 is a center vertical cross-sectional view of the dust box.

First, as illustrated in FIG. 14, the guide metal fitting 65 is constituted of an upper plate 80 screwed on the upper receiving surface 63 of the supporting arm 62, a lower plate 81 placed on the lower receiving surface 64, and a coupling portion 82 that couples the upper and lower plates 80 and 81 to one another. The upper plate 80 has an outer shape in plan view of a rectangular shape extending in the front-rear direction, and includes a pair of screw holes 83, 83 on both front and rear ends and a pair of cutouts 84, 84 on outer sides of the screw holes 83, 83. The lower plate 81 also has an outer shape in plan view of a rectangular shape extending in the front-rear direction, but includes a depressed relief portion 85 opening outward on the center in a longer side direction.

The lower plate 81 includes a pair of raised portions 86, 86 that stand upright from right and left longer sides and a pair of covering portions 87, 87 that extend from the upper ends of the raised portions 86, 86 to the inside in an opposite form. The raised portion 86 and the covering portion 87 on the outer side are separated in front and rear by the depressed relief portion 85.

The guide metal fitting 65 is secured to the supporting arm 62 such that, in a state where the upper plate 80 and the lower plate 81 are respectively placed on the upper receiving surface 63 and the lower receiving surface 64 to fit the positioning protrusions 66, 66 of the upper receiving surface 63 to the cutouts 84, 84 of the upper plate 80 for positioning, the upper plate 80 is screwed on the upper receiving surface 63 by screws 88, 88 via the screw holes 83, 83.

On the other hand, the sliding portion 43 has the lower surface on which a guide rail 90, made of the identical metal, is integrally disposed along the longer side direction. The guide rail 90 has a cross section in an inverted T shape constituted of an upper rail 91 downwardly disposed along an inferior edge of the lower side of the elongate hole 70 and a lower rail 92 orthogonally coupled to the lower end of the upper rail 91. The lower rail 92 is fitted to the lower plate 81 of the guide metal fitting 65 from the longer side direction, and the upper rail 91 is passed between the covering portions 87, 87, thus slidably guided by the guide metal fitting 65 in the front-rear direction. The lower rail 92 is guided in a state of being fitted to the lower plate 81 by four surfaces of a lower surface 92a in contact with the bottom surface of the lower plate 81 except a depressed groove 93 depressed on the bottom surface in the longer side direction, right and left side surfaces 92b, 92b in contact with the right and left raised portions 86, 86, and a top surface 92c in contact with the covering portions 87, 87.

As illustrated in FIG. 6, the lower plate 81 and the guide rail 90 are disposed in a region on the lower side with respect to a line L on a cross section passing through a center O of the sliding portion 43 in the horizontal direction and within a width (within a region where the lower plate 81 and guide rail 90 do not project from the sliding portion 43 in plan view) smaller than a right-left width H of the sliding portion 43.

Accordingly, the sliding portion 43 is held movable back and forth on the upper left side of the main body case 41 within a range where the front and rear stoppers 72 and 73 are in contact with the stopper 67 in a state where the guide metal fitting 65 restricts the rotation of the sliding portion 43. With this movement of the sliding portion 43 to back and forth, the flexible hose 79 expands and contracts between the base end of the nozzle 44 and the receiving cylinder portion 60 of the intermediate cylinder 58. The receiving cylinder portion 60 is small compared with an inner diameter of the sliding portion 43, and when the sliding portion 43 retreats, the receiving cylinder portion 60 relatively enters into the sliding portion 43 via the elongate hole 70, thus permitting the sliding portion 43 to retreat.

Figure 7:
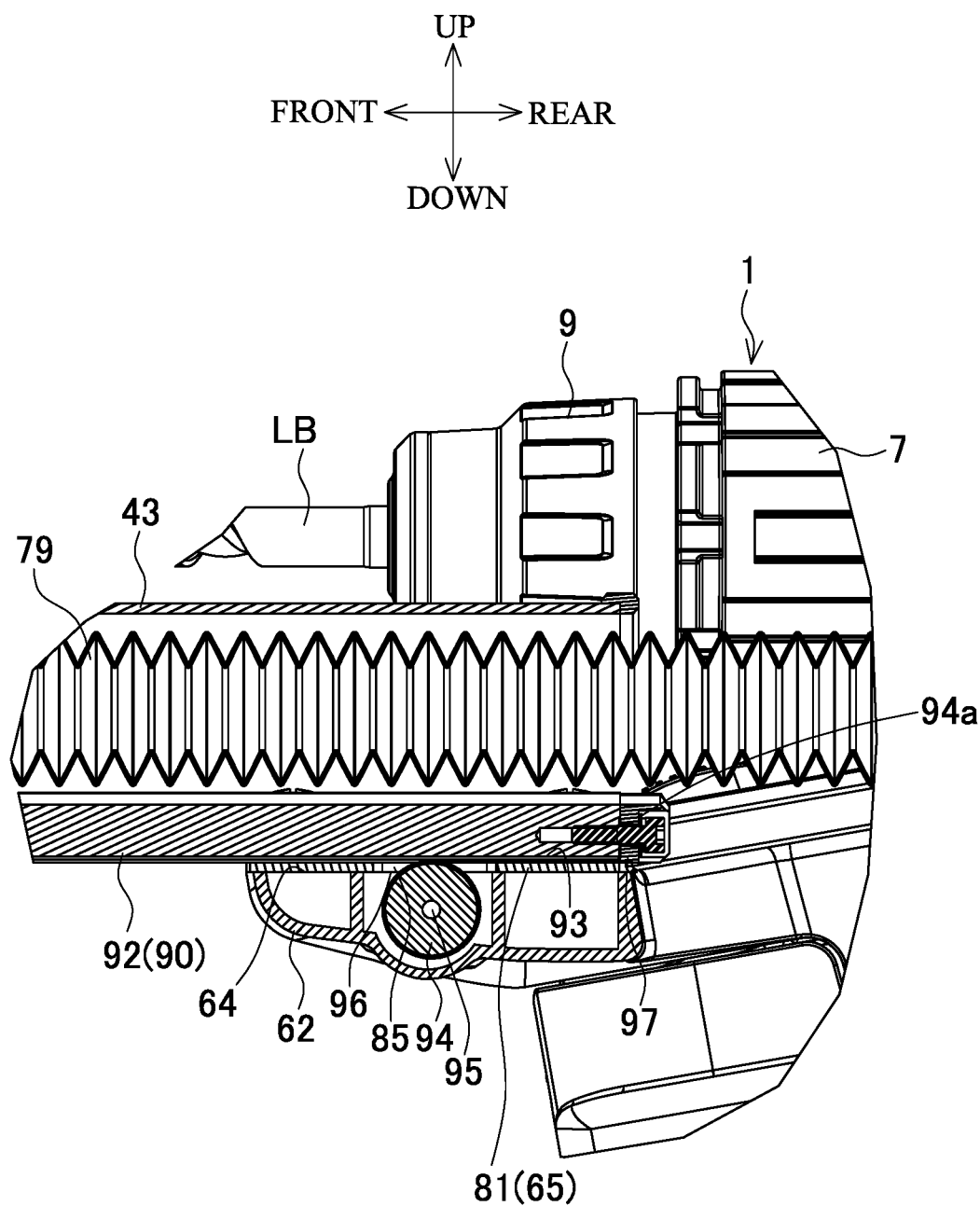
FIG. 7 is a cross-sectional view of a part taken along the line B-B in FIG. 3.

On the other hand, in the supporting arm 62, as illustrated in FIG. 7, a spiral spring 94 is rotatably supported by a support pin 95 in the right-left direction below the lower plate 81 of the guide metal fitting 65. The spiral spring 94 has an end portion 94a on the outer peripheral side that reaches the top surface of the lower plate 81 via a penetration hole 96 disposed on the lower receiving surface 64 and the depressed relief portion 85 of the lower plate 81. Then, the spiral spring 94 directly passes through the depressed groove 93 of the lower rail 92 to be extracted to the rear of the guide metal fitting 65, and is screwed to the rear end of the lower rail 92 so as to be coupled to a stop ring 97 that restricts a retreated position of the rear stopper 73. Therefore, the sliding portion 43 in the ordinary state is biased to an advance position (initial position) where the rear stopper 73 abuts on the stopper 67 due to a tensile force of the spiral spring 94.

Next, as illustrated in FIGS. 15A to 17, the dust box 42 includes a box main body 100 in a shape of a deep bottom box and a lid body 103 rotatably coupled to an opening 101 side and one end side in a longer side direction of the box main body 100 by a hinge shaft 102. The lid body 103 integrally includes a square tubular filter housing portion 104, which is small by one size compared with the box main body 100. The filter housing portion 104 projects to inside the box main body 100 in a state where the opening 101 of the box main body 100 is closed, and houses a filter unit 105 where a filter 107 is installed on a framing body 106. The framing body 106 has a rectangular shape and is fitted to the opening of the lid body 103 side. The filter 107 is made of paper and has folds parallel to the longer side direction of the framing body 106 to be folded in the shorter side direction. On the opening of the lid body 103 side, a cap cover 108 is covered, and the cap cover 108 fastens the filter unit 105. On the end portion of the opposite side to the hinge shaft 102 on the lid body 103, a loop portion 109 is disposed. The loop portion 109 has an L shape from the side view and has a distal end extending parallel to the filter housing portion 104 outside the filter housing portion 104.

Figure 18A:
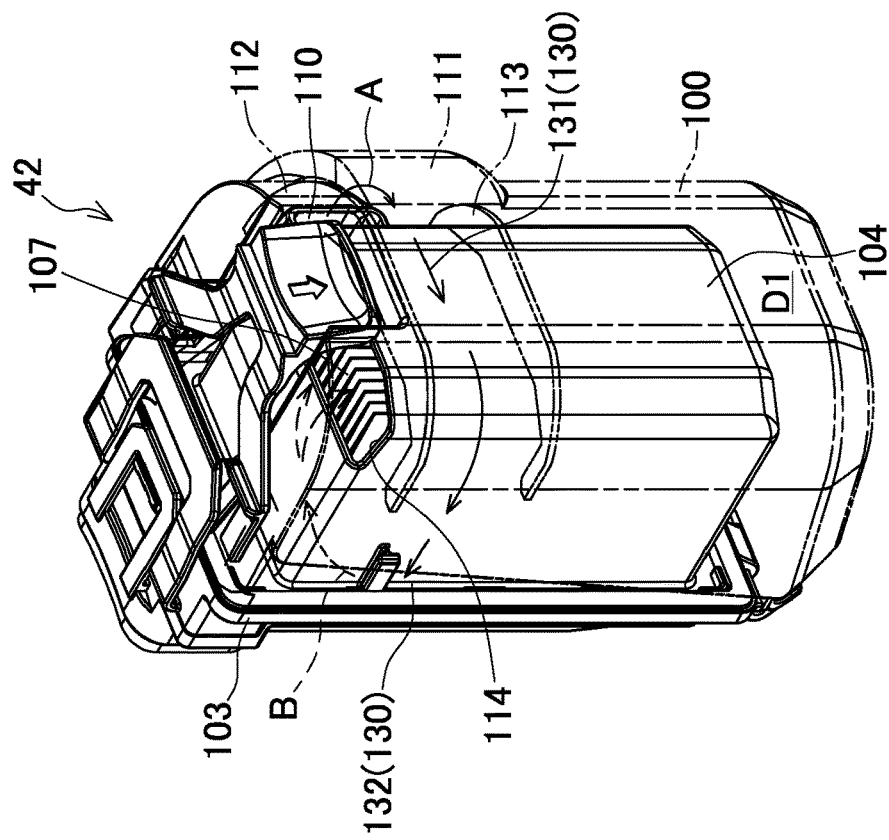
FIGS. 18A and 18B are explanatory views illustrating airflow inside the dust box viewed through a box main body.

On the left edge side of the lid body 103, a square cylinder 110, which is coupled to the guide cylinder portion 61 in a state of being coupled to the main body case 41 and has opening front and rear ends, as a flow path outlet is disposed perpendicular to the lid body 103 to project into the box main body 100. As illustrated in FIG. 16B, the square cylinder 110 is formed such that a length L2 is equal to or more than ⅓ of a depth L1 of the dust box 42. The length L2 is a length from the inner surface of the lid body 103 to a projecting end to the inside of the box main body 100. The depth L1 is a depth from the inner surface of the lid body 103 to the inner surface of the box main body 100 in the projection direction. Then, as illustrated in FIG. 18A, a top surface of the square cylinder 110 on the opposite side of the hinge shaft 102 is an inclined surface 110a that inclines downward toward the projecting end, so as to make the square cylinder 110 in a tapered shape where the opening area gradually decreases toward the projection direction.

Furthermore, on the inner surface of the box main body 100 positioned forward in the projection direction of the square cylinder 110, a guide passage 111 as a guide unit is disposed to project out to the outer surface along a circumferential direction. The guide passage 111 has a curved shape and a groove shape, and houses the square cylinder 110. However, the guide passage 111 is disposed to be gradually shallowed toward forward, and continuously coupled to the box main body 100 ahead of the filter housing portion 104. Further, on the inner surface of the box main body 100, a pair of upper and lower ribs, an upper rib 112 and a lower rib 113, are disposed. The upper and lower ribs 112 and 113 project to the filter housing portion 104 side in parallel on upper and lower ends of the guide passage 111. The upper and lower ribs 112 and 113 extend from the side surface on the square cylinder 110 side of the filter housing portion 104 in the circumferential direction, and go round to the side surface on the opposite side of the filter housing portion 104.

The filter housing portion 104 has an obstructed projecting end into the box main body 100, so as to have a horizontally long venthole 114 only in a region closer to the projecting end on the shorter side surface (shorter side surface on the upper side) opposite the hinge shaft 102.

On the upper side of the cap cover 108, a dust-collector-side exhaust port 115 in a square cylinder shape is disposed. The dust-collector-side exhaust port 115 is a tubular body that passes through the square hole 45 of the main body case 41 and has a front end on which a sealing member 116 is disposed over the whole circumference. On the internal side of the dust box 42 inside the dust-collector-side exhaust port 115, a U-shaped crossover piece 117 is disposed to be inwardly depressed, and the crossover piece 117 has a bottom portion on which a retention boss 118 is disposed obliquely downwardly. A metal contact pin 119 is independently disposed to be inserted into the retention boss 118, and the contact pin 119 passes through the dust-collector-side exhaust port 115 and the sealing member 116 to project obliquely downward. The dust-collector-side exhaust port 115 communicates with the filter housing portion 104 via an outlet 120 disposed on the lower side of the crossover piece 117. A locking loop 121 is disposed on the top surface of the cap cover 108 forward to be locked to a locking projection 122 disposed inside the loop portion 109 on the upper end of the lid body 103.

On the other hand, on the box main body 100, on a shorter side surface of the end portion on the hinge shaft 102 side, the receiving depressed portion 123 is disposed parallel to the hinge shaft 102. Furthermore, on the opening side of the shorter side surface of the end portion on the opposite side to the hinge shaft 102, a lid locking claw 124 is disposed. The loop portion 109 of the cap cover 108 is elastically locked to the lid locking claw 124 in a state where the lid body 103 is closed. On the identical shorter side surface, a pair of holders 125, 125 are disposed to protrude on the right and left of the lid locking claw 124 and hold a bifurcated base portion. On the identical shorter side surface, an operating member 126 is also disposed, which has a distal end as an L-shaped elastic piece 127 lying on a depressed portion 128 disposed on the shorter side surface of the box main body 100. On the outer surface of the base portion side on the operating member 126, the attaching and detaching locking claw 129 is disposed in a shape approximately identical to the lid locking claw 124.

Accordingly, when the opening 101 of the box main body 100 is closed by the lid body 103, the square cylinder 110 of the lid body 103 fits to the guide passage 111 of the box main body 100 such that the upper and lower ribs 112 and 113 partition above and below the square cylinder 110 between the box main body 100 and the filter housing portion 104. At this time, since the inclined surface 110a inclined downward to the projecting side is disposed on the top surface of the square cylinder 110, the projecting square cylinder 110 does not interfere with the box main body 100 even if the lid body 103 is rotated to the box main body 100 side around the hinge shaft 102, thus the lid body 103 is smoothly closed.

Thus, as illustrated in FIGS. 16A and 16B, the box main body 100 includes a dust separator 130 constituted of a semicircular swirling flow passage 131 and an inner surface portion 132 of the lid body 103. In the swirling flow passage 131, the air suctioned from the square cylinder 110 swirls along the inner circumference of the box main body 100 from the guide passage 111 between the upper and lower ribs 112 and 113, and goes round to the right edge side of the lid body 103 on the opposite side across the filter housing portion 104. In the inner surface portion 132, the air swirling the swirling flow passage 131 hit passing between the box main body 100 and the filter housing portion 104. The box main body 100 internally includes a first dust collecting chamber D1 communicated with the square cylinder 110 and the filter housing portion 104 internally includes a second dust collecting chamber D2 partitioned from the first dust collecting chamber D1. A sealing material 133 is a sealing material disposed along the outer periphery on the backside surface of the lid body 103, and surrounds the filter housing portion 104 to seal between the lid body 103 and the opening 101 of the box main body 100.

The dust box 42 is pushed into the main body case 41 from the front of the main body case 41 such that first, the receiving depressed portion 123 is locked to the shaft portion 57 in a direction where the lid body 103 comes backward and the receiving depressed portion 123 comes to the lower side, and in this state, the dust box 42 is rotated rearward with the shaft portion 57 as a fulcrum. Then, the attaching and detaching locking claw 129 is elastically locked to the locking stepped portion 56 of the main body case 41 to causes the dust box 42 to be combined with the main body case 41. At this time, the intermediate cylinder 58 of the main body case 41 is coupled to and communicated with the front end of the square cylinder 110 of the dust box 42. Simultaneously, the dust-collector-side exhaust port 115 disposed on the lid body 103 passes through the square hole 45 of the main body case 41 to project rearward. In this state, the contact pin 119 also projects rearward from the square hole 45.

In the dust collection system S configured as described above, when the dust collector 40 that includes the dust box 42 is installed on the hammer drill 1, first, the locking shafts 55, 55 of the main body case 41 are locked to the respective lower cutouts 32, 32 disposed on the hammer drill 1. Next, from this inclined posture, the upper side of the dust collector 40 is pushed up rearward to be rotated so as to be fitted to the front surface of the hammer drill 1. Then, the hook 50 of the swing plate 48 is brought in contact with the stop 33 of the front housing 7 to sink into the guide groove 47 of the main body case 41, thus swinging the swing plate 48 to the downward position (release position). When the hook 50 is proceeded over the stop 33, as illustrated in FIG. 8, the swing plate 48 swings to the upward position (lock position) to cause the hook 50 to project upward so as to lock to the stop 33 of the front housing 7. Then, the installation of the dust collector 40 completes.

With the installation of the dust collector 40, the contact pin 119 projecting from the dust-collector-side exhaust port 115, which passes through the square hole 45 of the main body case 41, is brought in contact with the shutter member 27, so as to cause the shutter member 27 to be lain down rearward against the biasing by the torsion spring 29, thus opening the upper inlet 25. Simultaneously, the sealing member 116 of the dust-collector-side exhaust port 115 is brought in close contact with the peripheral area of the upper inlet 25, so as to cause the dust-collector-side exhaust port 115 to communicate with the upper inlet 25 in a sealed state. Thus a dust collecting route R1 is coupled to an intake route R2. The dust collecting route R1 is a route from the suction opening 76 to the dust-collector-side exhaust port 115 via the nozzle 44, the flexible hose 79 inside the sliding portion 43, the intermediate cylinder 58, from the square cylinder 110 of the dust box 42 to the dust separator 130, the venthole 114, the filter housing portion 104, and the outlet 120. The intake route R2 is a route from the upper inlet 25 to the upper fan 14 passing through upward the shutter member 27 and the separation chamber 23.

Figure 19:
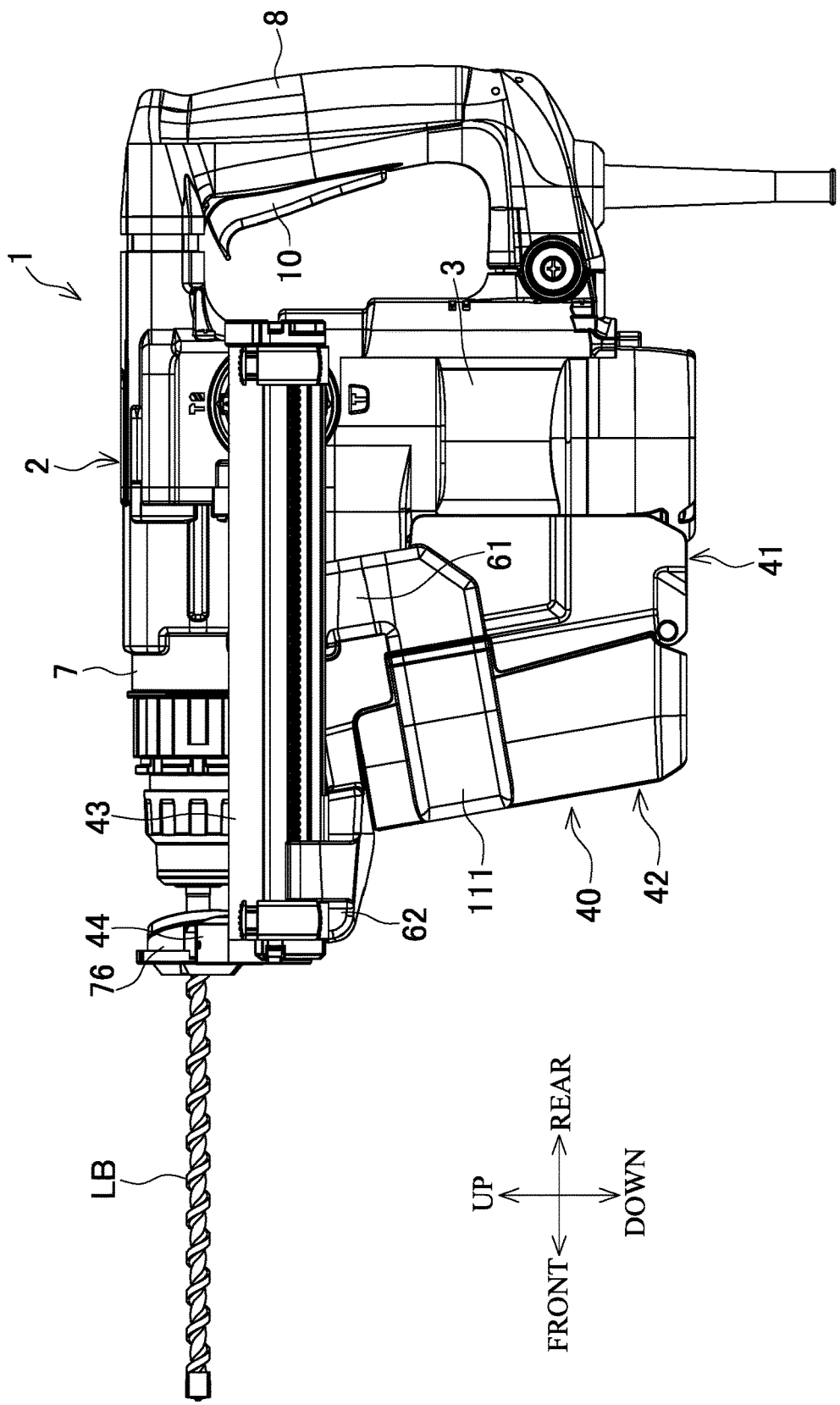
FIG. 19 is a side view illustrating a state where a sliding portion is retreated.

Then, the initial position of the rear stopper 73 on the rails 71, 71 of the sliding portion 43 is adjusted such that the distal end of a bit (long bit or short bit) is positioned on the suction opening 76 projectingly biased with the sliding portion 43, thus adjusting the position of the front stopper 72 in accordance with the drilling depth. Subsequently, the suction opening 76 is brought in contact with a surface to be drilled and the switch lever 10 of the hammer drill 1 is performed with a push operation to turn ON the switch, so as to drive the motor 4 to rotate the output shaft 5. At this time, when the drill mode or the hammer drill mode is selected by the change lever 12, the bit rotates to allow the surface to be drilled to be drilled, and as the drilling proceeds, as illustrated in FIG. 19, the bit (here, the long bit LB) passes through the suction opening 76, such that the sliding portion 43 is relatively retreated from the supporting arm 62 against the biasing by the spiral spring 94. At this time, the receiving cylinder portion 60 relatively advances inside the sliding portion 43, so as to contract the flexible hose 79.

Here, the sliding portion 43 slides in a state where the guide rail 90 disposed on the lower side is guided by the guide metal fitting 65 on the supporting arm 62. While the guide rail 90 is directly guided, since the lower rail 92 of the guide rail 90 is supported by the lower plate 81 of the guide metal fitting 65 on the four surfaces of upper, lower, right, and left as described above, the guide rail 90 can smoothly slide without rattling. Especially, since the guide rail 90 and the lower plate 81 are disposed on a narrow area on the lower side of the sliding portion 43 within the right-left width of the sliding portion 43, tangle of the guide rail 90 is reduced in sliding, thus providing an excellent accuracy to the slide. Further, damages from outside are reduced.

On the other hand, due to the rotation of the lower fan 15 caused by the rotation of the output shaft 5, the outside air is suctioned from the lower inlet 18 of the motor housing 3, and passes the motor 4 to be cooled. Then, the outside air passes from the lower fan 15 to the fan housing chamber 13 and is discharged from the power-tool-side exhaust port 26.

Simultaneously, the rotation of the upper fan 14 generates a suctioning force on the suction opening 76 of the dust collector 40, and air is suctioned from the suction opening 76 with dust generated in the drilling, passes through the flexible hose 79 via the nozzle 44, and enters into the square cylinder 110 of the box main body 100 of the dust box 42 from the intermediate cylinder 58.

Figure 18B:
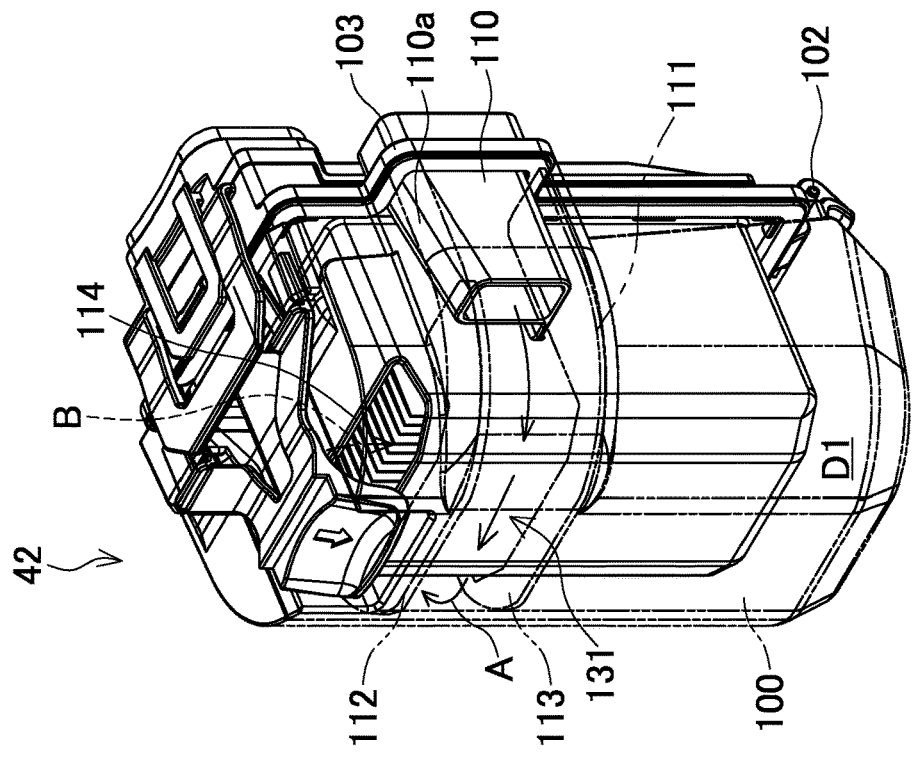

Subsequently, as indicated by a solid arrow A in FIGS. 16A, 18A, and 18B, the air exited from the square cylinder 110 is guided by the guide passage 111 and the upper and lower ribs 112 and 113 to flow changing the direction along the swirling flow passage 131. Then, the air goes round to the right side of the filter housing portion 104 to hit the inner surface portion 132 of the lid body 103, the inner surface of the box main body 100, and similar surface. Then, the air changes the direction upward indicated by a dashed arrow B to go round to the top surface side from the side surface of the filter housing portion 104, so as to enter the filter housing portion 104 from the venthole 114. Accordingly, the comparatively large dust is separated when the air swirls through the swirling flow passage 131 and when the air hits the inner surface portion 132 to change the direction, thus falling into the first dust collecting chamber D1 of the box main body 100. Since the upper and lower ribs 112 and 113 are interrupted before reaching the inner surface portion 132 on the right side of the filter housing portion 104, the dust falls down through a space between the lower rib 113 and the inner surface portion 132.

The air entered into the filter housing portion 104 passes through the filter 107, subsequently passes through the dust-collector-side exhaust port 115 via the outlet 120, so as to be discharged outside the dust box 42. Then, the air passes through the upper inlet 25 to reach the separation chamber 23, passes through the upper side of the shutter member 27 on the lain down position, passes through the upper fan 14 and the fan housing chamber 13 from the through hole 21 of the plate member 19, and is discharged from the power-tool-side exhaust port 26.

Accordingly, fine dust is captured by the filter 107 to remain in the filter housing portion 104. In this state, since the filter housing portion 104 is partitioned from the first dust collecting chamber D1 except the venthole 114 on the upper side, the fine dust in the filter housing portion 104 is accumulated in the second dust collecting chamber D2 in a state of being separated from the large dust in the box main body 100.

Here, even if a flow amount in the dust collecting route R1 decreases due to the dust accumulated in the first and second dust collecting chambers D1 and D2, since the square cylinder 110 is formed in the tapered shape toward the projection direction to gradually throttle the opening area, a flow rate of the air blown out from the square cylinder 110 is ensured so as to maintain dust collection efficiency. When the drilling work is performed upward, since the box main body 100 comes to the upper side and the square cylinder 110 projects upward inside the box main body 100, the square cylinder 110 is not obstructed by the dust even if the dust accumulates in the first dust collecting chamber D1, thus maintaining the dust collection function. Furthermore, even the square cylinder 110 is projected such way, since the guide passage 111 in the curved shape is disposed ahead of the square cylinder 110, the blown out air and dust change the direction to be smoothly guided to the right side of the filter housing portion 104, and the dust abutting on the box main body 100 is less likely to rebound to the square cylinder 110 side.

After the operation terminates, when the dust collector 40 is removed, the button 52 is pushed to swing the swing plate 48 to the downward release position so as to release the hook 50 from the stop 33. Then, in this state, when the dust collector 40 is rotated to be brought down forward, the dust collector 40 is directly removed. Simultaneously with this removing, the contact pin 119 moves forward to release the pushing of the shutter member 27. Accordingly, the shutter member 27 returns to the standing position to obstruct the upper inlet 25.

The dust is discharged from the dust box 42 in the following manner. First, the elastic piece 127 of the operating member 126 of the box main body 100 is pushed from the forward of the main body case 41 to release the lock of the attaching and detaching locking claw 129 to the locking stepped portion 56. Then, the dust box 42 is tilted forward with the shaft portion 57 as the center to directly remove the dust box 42 from the main body case 41. Next, the loop portion 109 of the lid body 103 is released from the lid locking claw 124 to open the lid body 103 from the box main body 100, thus discharging the large dust accumulated in the first dust collecting chamber D1. At this time, since the second dust collecting chamber D2 of the filter housing portion 104 is simultaneously opened outside via the venthole 114, fine dust can be also discharged from the venthole 114 by having the dust box 42 inclined or downward.

Thus, according to the dust collector 40 of the above embodiment, the sliding portion 43 includes the guide rail 90 slidably supported by the guide metal fitting 65 disposed on the main body case 41. Since the guide metal fitting 65 and the guide rail 90 are located within a region in the lower half side with respect to a line L on a cross section passing through a center of the sliding portion 43, the sliding portion 43 can be guided by only the guide rail 90 within the region in a half side of the sliding portion 43. Then, the guide structure becomes compact to provide an excellent operability in a narrow space. The guide rail 90 less likely to be exposed reduces the possibility of being damaged. Furthermore, the guide rail 90 guided in the narrow region reduces the occurrence of the tangle and the looseness. Then, the sliding portion 43 can be accurately guided while maintaining the slidability.

Especially, here, the guided portion is formed as the rail-shaped protrusion (the guide rail 90) projecting from the sliding portion 43, and the guided surfaces (the lower surface 92*a*, both side surfaces 92*b*, 92*b*, and the top surface 92*c* of the lower rail 92) are disposed on the guide rail 90 in four directions on a lateral cross section perpendicular to the sliding direction. Then, the sliding portion 43 can be smoothly guided by the guided surface in the four directions without rattling, thus providing the excellent guide accuracy.

The metallic guide metal fitting 65 as the guiding portion ensures the strength.

Furthermore, the sliding portion 43 is located on the main body case 41 such that the sliding portion 43 comes on the position displaced to the left side from just below the bit of the hammer drill 1 in a state where the main body case 41 is installed on the hammer drill 1. The guide rail 90 projects to the lower side of the sliding portion 43, and the guide metal fitting 65 and the guide rail 90 are located within the region in the lower side with respect to the center of the sliding portion 43. Then, the guide metal fitting 65 and the guide rail 90 are not exposed from the sliding portion 43 in plan view, thus reducing the damage from the outside (especially, the upper side).

In addition, the main body case 41 includes the spiral spring 94 that projectingly biases the sliding portion 43 forward, and the spiral spring 94 passes between the guide metal fitting 65 and the guide rail 90 to be coupled to the sliding portion 43. Then, the spiral spring 94 can be coupled to the sliding portion 43 with a small space.

Figure 20:
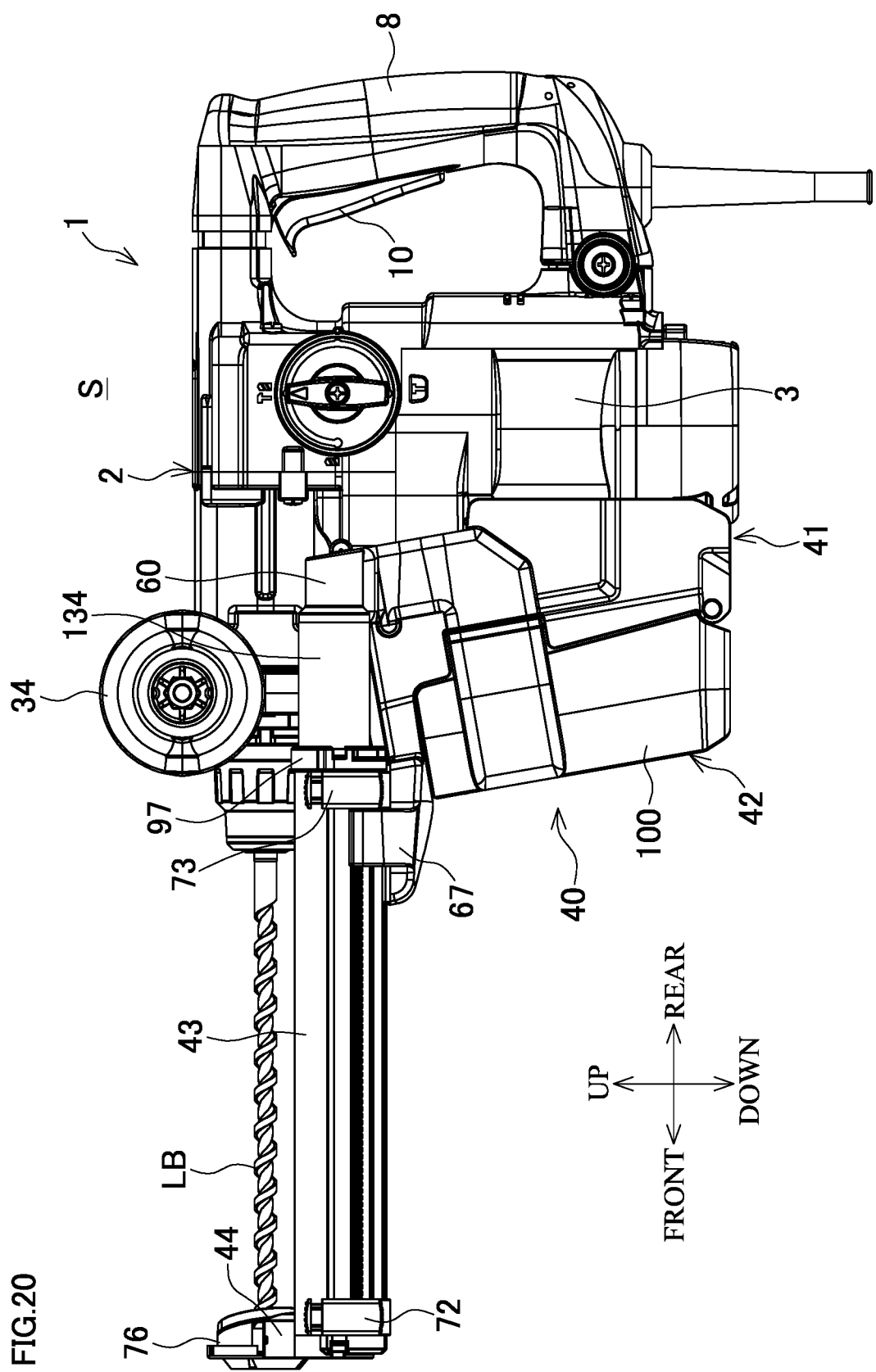
FIG. 20 is a side view of the dust collection system illustrating a modification example of the sliding portion.
Figure 21:
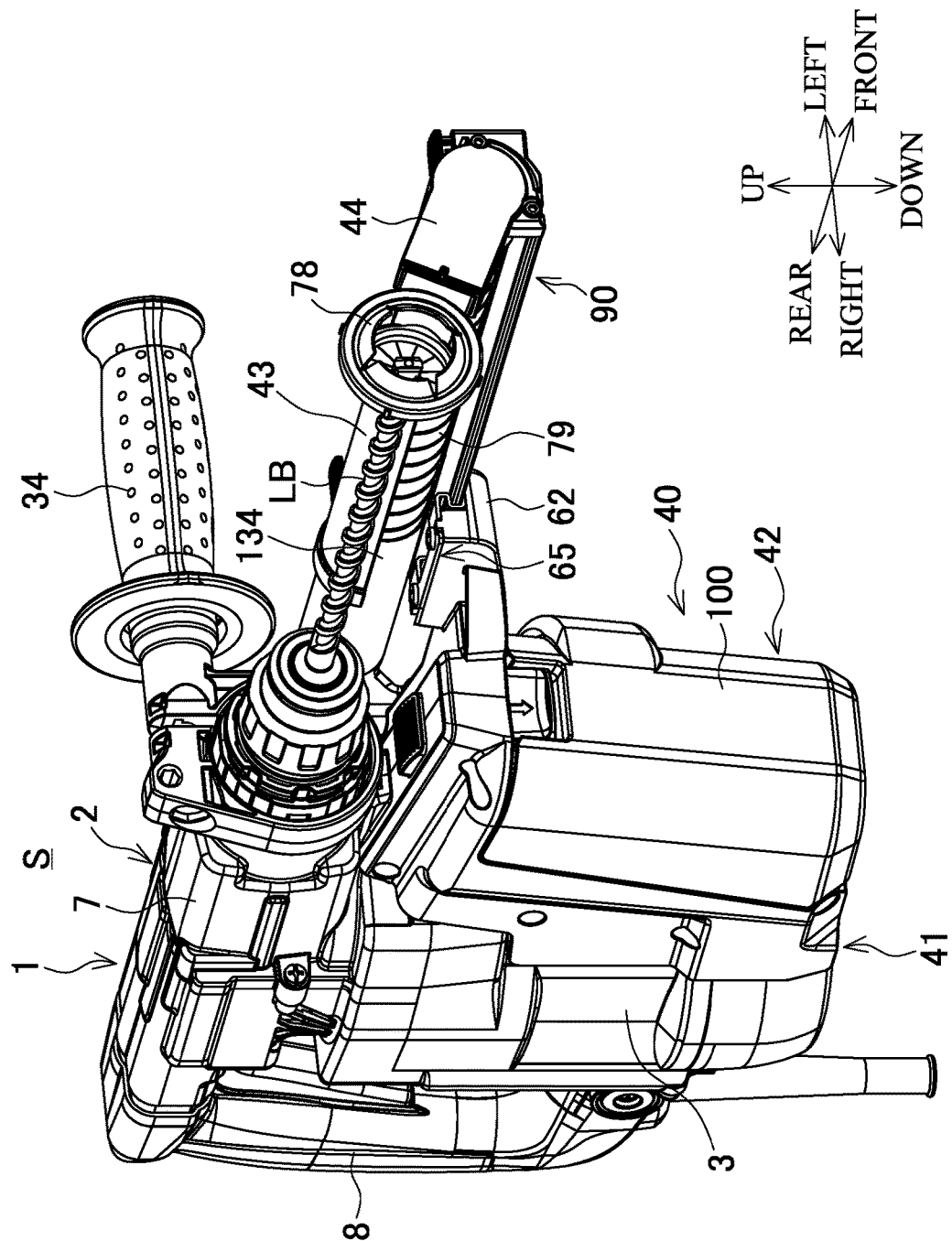
FIG. 21 is a perspective view of the dust collection system illustrating the modification example of the sliding portion.

While the sliding portion is formed as a single pipe in the above embodiment, as illustrated in FIGS. 20 and 21, the sliding portion 43 may have a telescope structure constituted of two tubular bodies such that the receiving cylinder portion 60 is coupled to a pipe 134 that covers the rear portion of the flexible hose 79 and is inserted into the sliding portion 43 from the rear side. In this case, the slide of the sliding portion 43 to back and forth is guided by also the pipe 134, thus improving the slidability. In addition, since the flexible hose 79 is not exposed, the flexible hose 79 is prevented from being displaced and damaged.

Furthermore, while the sliding portion is shifted to the left side of the bit in the above embodiment, not limiting to this, the sliding portion may be shifted to the right side of the bit with the supporting arm formed to project to the right side of the main body case.

However, in the former embodiment, the sliding portion 43 is formed to be short in axial length such that the sliding portion 43 has the rear end positioned ahead of the receiving cylinder portion 60, to which the rear portion of the flexible hose 79 is coupled, on the initial position of the sliding portion 43. Then, even if the sliding portion 43 retreats by a maximum stroke, the rear end projects rearward from the receiving cylinder portion 60 only by a little amount, thus providing the effect that the sliding portion 43 does not hinder the work. That is, according to the disclosure, the dust collector includes the tubular sliding portion that has the nozzle, and a pipe body such as the flexible hose forming the dust collecting route is inserted into the sliding portion, and the pipe body has the rear end coupled to the case body. The sliding portion is configured to be short in axial length such that the rear end of the sliding portion is positioned ahead of the coupling position of the rear end of the pipe body and the case body at the frontmost position of the sliding portion.

Thus, according to the dust collector 40 and the hammer drill 1 with the dust collector 40 in the above embodiment, the square cylinder 110 included in the dust collecting route R1 and projecting into the dust box 42 is formed in the tapered shape toward the projection direction. Then, even if the amount of the dust inside the dust box 42 increases and then the flow amount of the air decreases, the decrease of the flow rate in the square cylinder 110 can be reduced to maintain the dust collection efficiency.

Especially, here, the square cylinder 110 as the flow path outlet is less likely to be obstructed by the dust even if the square cylinder 110 is used upward in an upward work and similar work, thus ensuring the dust collection efficiency.

The square cylinder 110 is configured to have the projection length L2 equal to or more than ⅓ of the depth L1 of the dust box 42 in the projection direction. Then, the square cylinder 110 can be configured in a preferred length less likely to be obstructed by the dust.

Furthermore, the part ahead of the square cylinder 110 in the projection direction in the dust box 42 is the guide passage 111 that changes the direction of the air discharged from the square cylinder 110 sideways. Then, even the square cylinder 110 projecting into the box main body 100 can reduce the rebound of the dust to smoothly guide downstream.

On the other hand, the dust box 42 includes the box main body 100 where the dust accumulates and the lid body 103 configured to open and close the box main body 100, and the square cylinder 110 is disposed on the lid body 103. Then, the square cylinder 110 can be surely projected at the proper position inside the box main body 100 simultaneously with the close of the box main body 100 by the lid body 103.

The box main body 100 and the lid body 103 are connected by hinge connection, and the square cylinder 110 has the surface positioned on the opposite side of the hinge shaft 102 as the inclined surface 110a forming the tapered shape. Then, the inclined surface 110a can be used to throttle the opening area of the square cylinder 110 and also used as an escaping portion that prevents the square cylinder 110 from interfering with the box main body 100 in open and close of the lid body 103 in the hinge connection.

The flow path outlet is not limited to the square cylinder, and may be the other cornered cylinder and a cylinder. The hinge connection of the box main body and the lid body is not limited to the lower side, and may be the upper side and the lateral side. Then, the tapered inclined surface is simply disposed on the opposite side of the hinge connection in accordance with the position of the hinge shaft. However, not only the opposite side of the hinge shaft, but also the other surface and every surface may be formed in the tapered shape as an inclined surface and a curved surface. Needless to say, when the connection of the box main body and the lid body is not the hinge connection, the position of the inclined surface and similar surface is appropriately selectable.

The flow path outlet is not limited to the pipe shape, and may be a semi-cylindrical shape and similar shape. The projection length into the dust box may be long or short compared with the above embodiment as long as equal to or more than ⅓ of the depth of the dust box. The projecting position of the flow path outlet may be appropriately changed in accordance with the form of the dust collecting route inside the dust box.

Furthermore, while the square cylinder as the flow path outlet is disposed on the lid body in the above embodiment, even when the square cylinder or similar cylinder as the flow path outlet is disposed on the main body case and the flow path outlet passes through a through hole disposed on the lid body, the flow path outlet that projects into the dust box can be formed On the other hand, in the disclosure according to the flow path outlet, the dust box is not limited to be removably attachable to the main body case, and may be integrated with the main body case to be configured to dispose the dust by the open and close of the lid body. While the dust collector in the above embodiment uses the fan on the hammer drill side to vacuum the dust, the main body case may include the motor and the fan for dust collection and electric power is supplied from the electric power tool side. The mounting structure of the main body case and the electric power tool may be appropriately changed.

Furthermore, while the filter housing portion is formed inside the dust box to dividingly form the first dust collecting chamber and the second dust collecting chamber inside the box main body in the above embodiment, a configuration without such division may be employed.

On the other hand, not limiting to the configuration where the sliding portion is shifted to the left and right sides of the bit in the above embodiment, a sliding portion 223 may be supported with respect to a main body case 221 so as to be positioned just below the bit as a dust collector 40A illustrated in FIG. 22. The following describes modification examples of the sliding portion and the guide metal fitting.

FIGS. 22 to 26 illustrate an exemplary dust collection system S where a dust collector for an electric power tool (hereinafter simply referred to as a "dust collector") is installed on a hammer drill 1A as an electric power tool.

Figure 22:
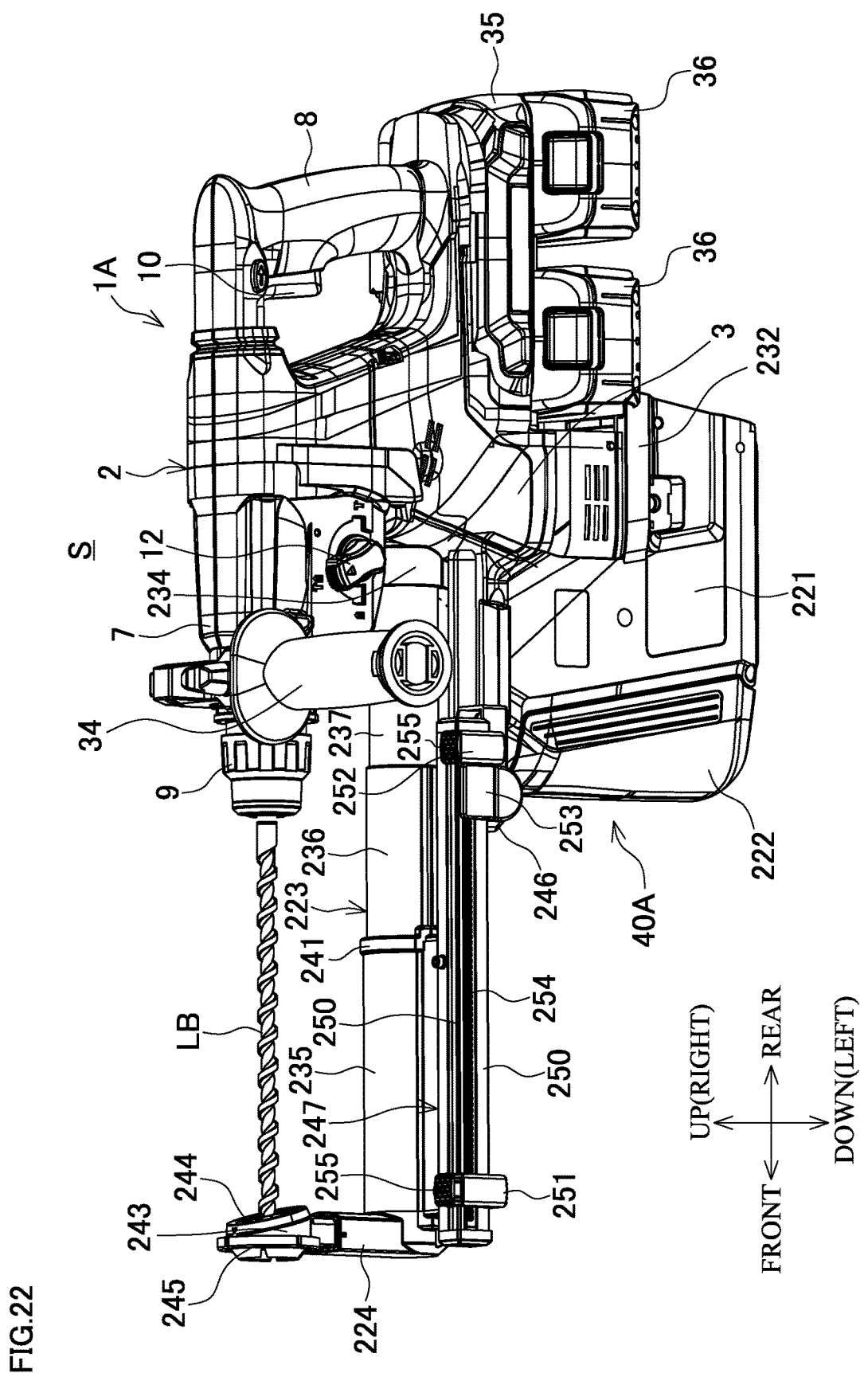
FIG. 22 is a perspective view illustrating a modification example of the dust collection system from a side.
Figure 23:
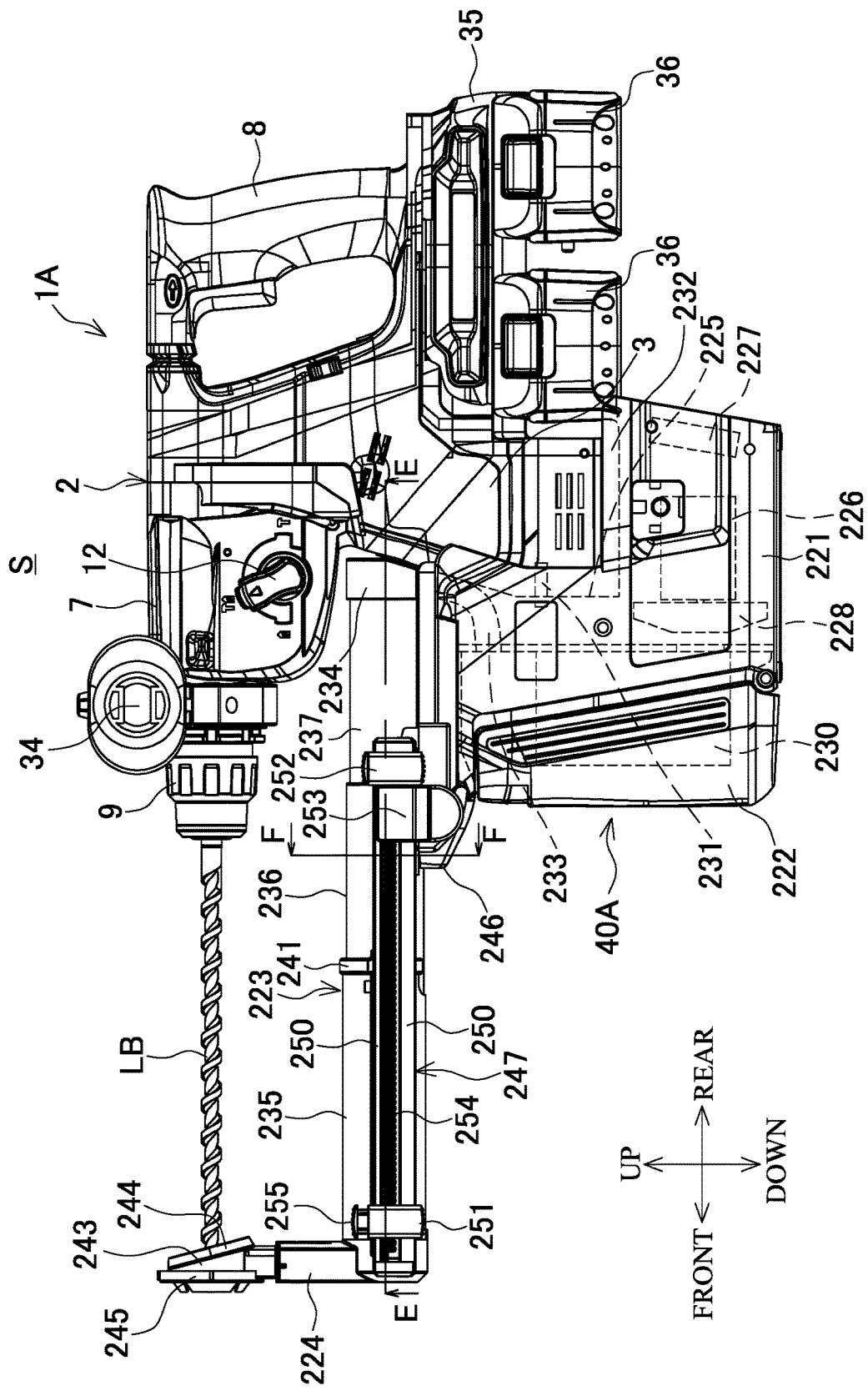
FIG. 23 is a side view of the dust collection system in the modification example.
Figure 24:
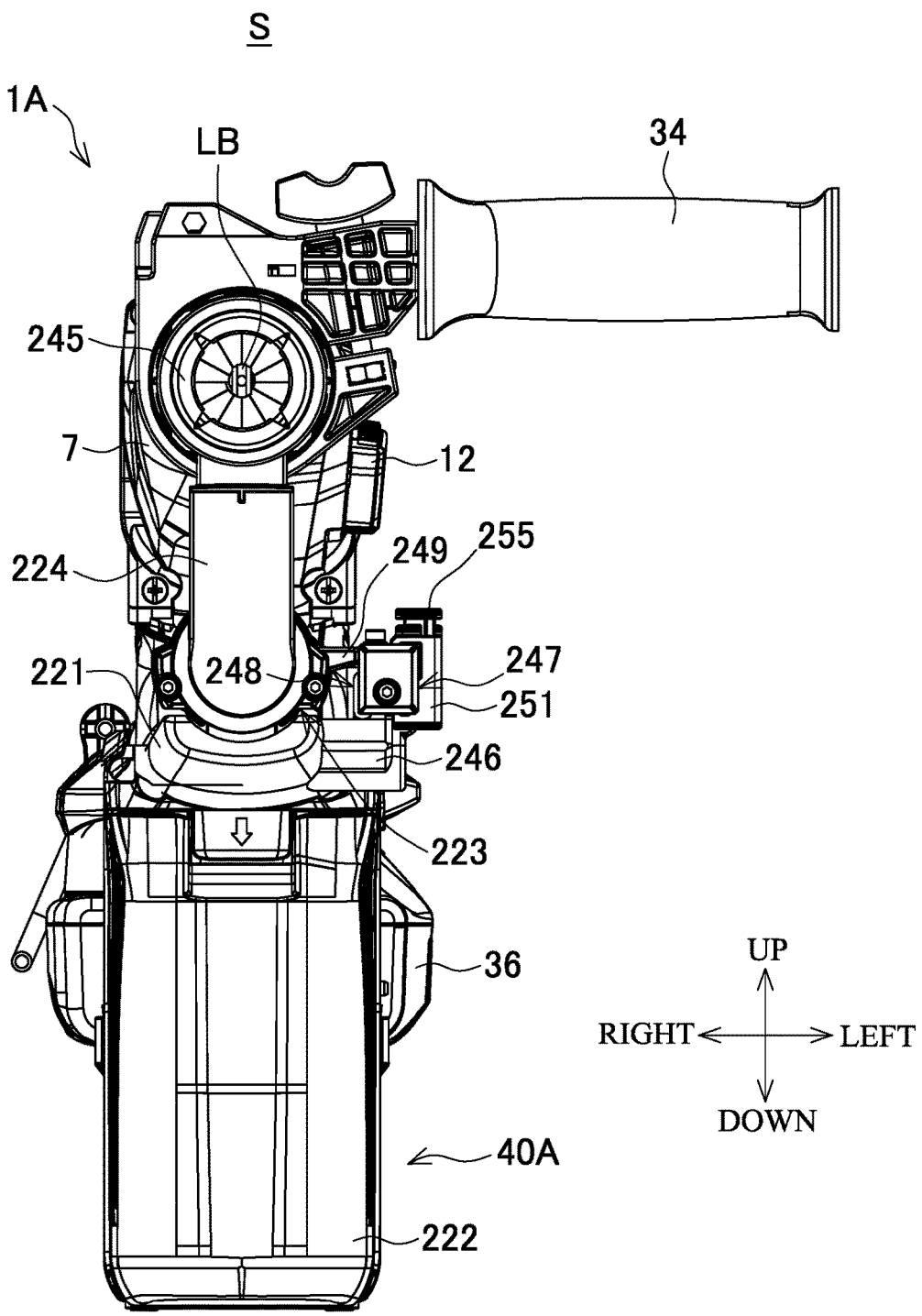
FIG. 24 is a front view of the dust collection system in the modification example.
Figure 25:
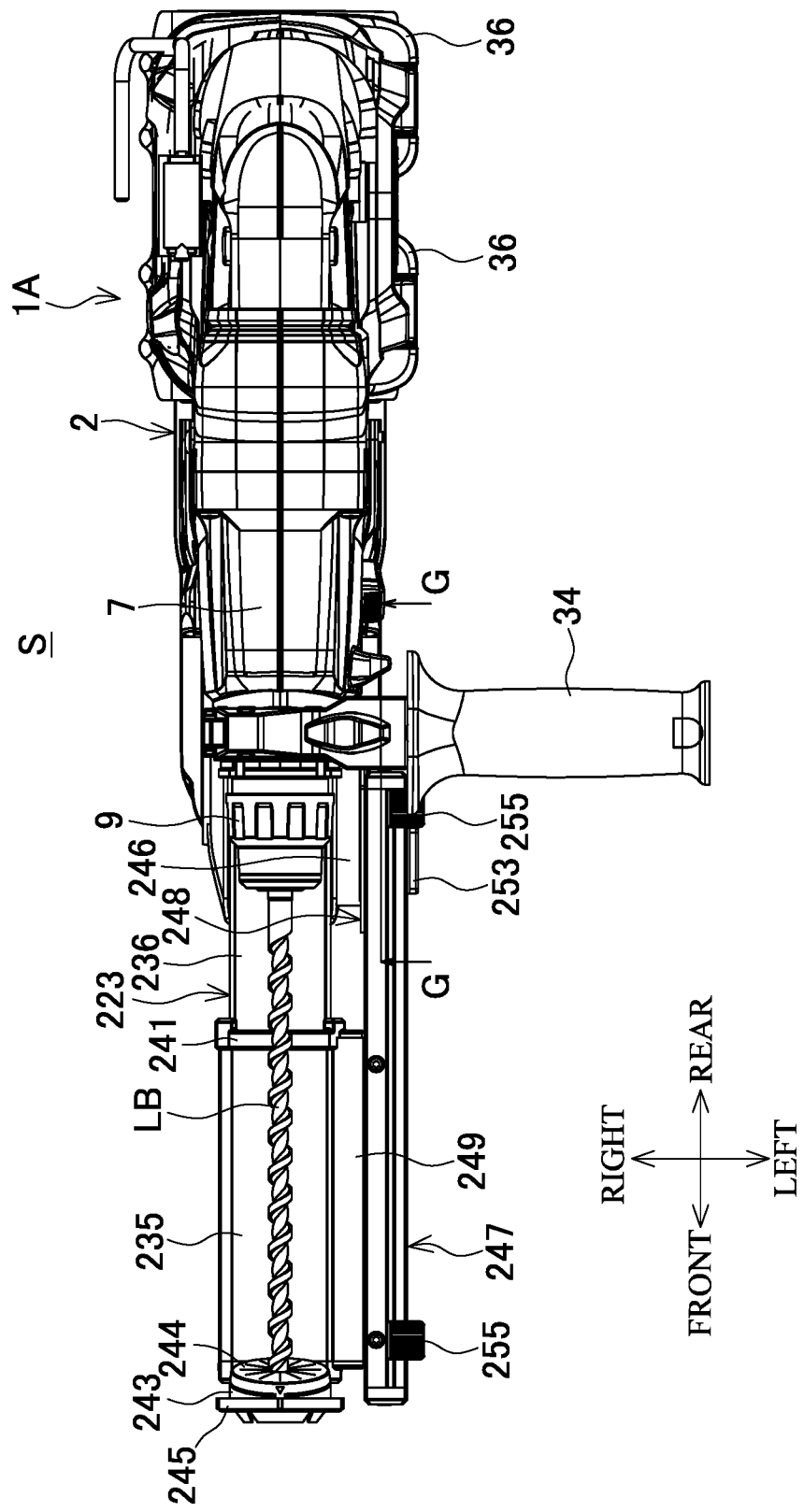
FIG. 25 is a plan view of the dust collection system in the modification example.
Figure 26:
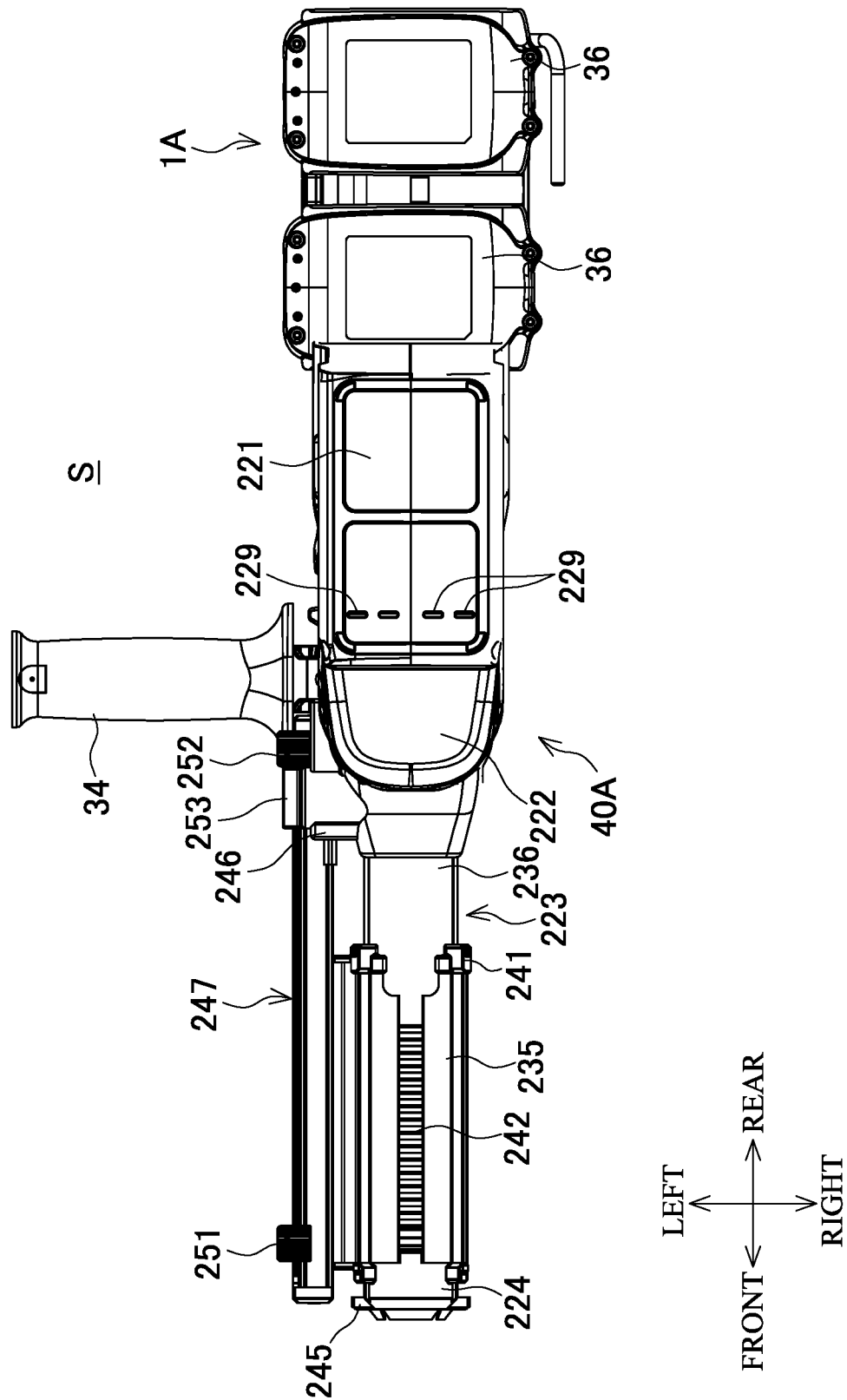
FIG. 26 is a bottom view of the dust collection system in the modification example.

FIG. 22 is a perspective view from a side portion, FIG. 23 is a side view, FIG. 24 is a front view, FIG. 25 is a plan view, and FIG. 26 is a bottom view.

First, the hammer drill 1A includes a motor housing 3, which houses a motor 4, on a front lower portion of a main body housing 2, and a handle housing 8 coupled to a rear upper portion of the main body housing 2. The hammer drill 1A includes a battery mounting portion 35 on a lower portion of the handle housing 8. The battery mounting portion 35 is configured to mount two battery packs 36, 36 as power sources arranged back and forth. On a front portion of the main body housing 2, a front housing 7 is assembled, and the front housing 7 internally includes a tool holder (not illustrated) that has a distal end on which a tool bit (in FIG. 22 and similar drawing, a long bit LB is illustrated) is mountable by an operation sleeve 9.

On a side surface of the front housing 7, a change lever 12 for a switching operation of an operation mode is disposed, and the change lever 12 allows selecting a hammer mode, a drill mode, and a hammer drill mode. The hammer mode is a mode where a hammering mechanism is operated to provide a hammering on the tool bit. The drill mode is a mode where a rotation mechanism is operated to rotate the tool bit with the tool holder. The hammer drill mode is a mode where the hammering mechanism and the rotation mechanism are simultaneously operated to provide the hammering and the rotation on the tool bit.

Here, the motor housing 3 is a mounting portion to the dust collector. On a front surface side of the motor housing 3, a female connector (not illustrated) with a female terminal for power feeding is disposed. On lower both sides of the motor housing 3, connecting grooves (not illustrated) for connecting to the dust collector are disposed.

Next, the dust collector 40A is constituted of the main body case 221, a dust box 222, and the sliding portion 223. The main body case 221 is L-shaped from the side view and mounted to the motor housing 3 of the hammer drill 1A. The dust box 222 is removably mounted from the front side of the main body case 221. The sliding portion 223 is supported by the upper portion of the main body case 221 and includes a nozzle 224 on the distal end.

First, the main body case 221 is formed by combining right and left half cases, and has an upper rear surface where a fitting depressed portion 225 is formed to be fitted to the motor housing 3 of the hammer drill 1A. At the rear of the main body case 221, a motor 226 is housed to have an output shaft forward, and at the rear of the motor 226, a controller 227 is disposed. The motor 226 has the output shaft to which a dust collection fan 228 is fixedly secured, and the dust collection fan 228 is housed in an intake air chamber that has a lower surface where exhaust outlets 229, 229 . . . are disposed. The intake air chamber has a front portion as a joint to the dust box 222, and the joint is configured to removably mount the dust box 222, which houses a filter 230, from the front. In the mounted state, an outlet on the rear surface lower side is communicated with the intake air chamber.

Furthermore, the fitting depressed portion 225 of the main body case 221 includes three plate-shaped male terminals 231, 231 . . . arranged side by side in the right-left direction at predetermined intervals. The male terminals 231 project rearward and are disposed for power supply and communication. The male terminals 231 electrically coupled to the controller 227 by lead wires (not illustrated).

Then, the main body case 221 has a rear top surface where a pair of guide ribs 232, 232 are disposed upright on both right and left sides in the front-rear direction. Each guide rib 232 includes a convex (not illustrated) on the inside of the upper end, and the convex is fittable to the connecting grooves disposed on the side surfaces of the motor housing 3.

On the upper side of the joint of the dust box 222, a guide passage 233 is disposed. The guide passage 233 has an upper end that includes a receiving portion 234 projecting to the top surface of the main body case 221, and a lower end coupled to an inlet on the rear upper side of the dust box 222 inside the main body case 221.

Accordingly, the main body case 221 is joined with the motor housing 3 such that the convexes are fitted to the connecting grooves between the guide ribs 232, 232 so as to relatively slide the motor housing 3 in the front-rear direction, thus fitting the motor housing 3 to the fitting depressed portion 225 on the rear upper side. With this joining, the male terminal 231 is electrically connected to the female connector, thus feeding power from the hammer drill 1A to the motor 226 and the controller 227.

On the other hand, the sliding portion 223 is made of resin and a hollow cylindrical body. The sliding portion 223 has the telescope structure constituted of three tubular bodies of a front cylinder 235, a middle cylinder 236, and a rear cylinder 237. However, here, the rear cylinder 237 is the smallest in diameter, the middle cylinder 236 has a large diameter compared with the rear cylinder 237 to fit onto the rear cylinder 237 from the front, and the front cylinder 235 has a large diameter compared with the middle cylinder 236 to fit onto the middle cylinder 236 from the front. That is, the sliding portion 223 has an inverse telescope structure where the tubular body has the diameter increasing forward in stages. The rear cylinder 237 has the rear end coupled to the receiving portion 234 so as to be communicated with the dust box 222 via the guide passage 233.

Figure 27:
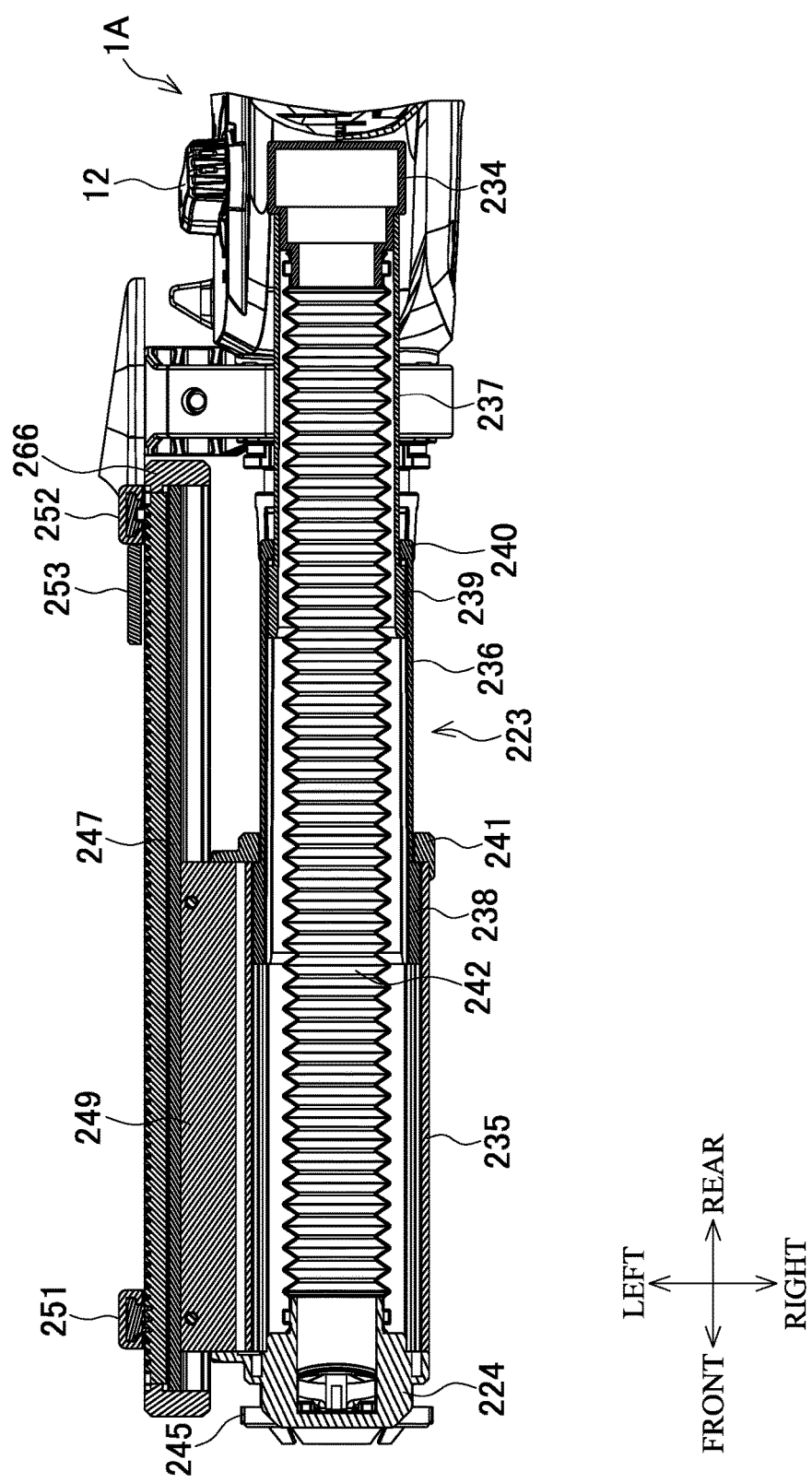
FIG. 27 is a cross-sectional view of a part taken along the line E-E in FIG. 23.

As illustrated in FIG. 27, on frontouter peripheries of the middle cylinder 236 and the rear cylinder 237, outer stopper portions 238 and 239 are circularly disposed, respectively. On an inner periphery of a rear end of the middle cylinder 236, an inner stopper portion 240 is disposed. Accordingly, when the rear cylinder 237 is inserted into the middle cylinder 236 from the front side, the outer stopper portion 239 is locked to the inner stopper portion 240, thus the middle cylinder 236 and the rear cylinder 237 are mutually retained. When the middle cylinder 236 is inserted into the front cylinder 235 from the front side and a stopper ring 241 is installed at the rear end of the front cylinder 235, the outer stopper portion 238 is locked to the stopper ring 241, thus the front cylinder 235 and the middle cylinder 236 are mutually retained.

The nozzle 224 has a base end coupled to the front end of the front cylinder 235, and projects upward from the front cylinder 235. Inside the sliding portion 223 and between the base end of the nozzle 224 and the receiving portion 234, a flexible hose 242 is coupled.

The nozzle 224 has an upper end where a ring-shaped suction opening 243 is disposed and a drill bit passes through the suction opening 243. The suction opening 243 has a rear opening to which a rubber cap 244 fits and a front opening to which an obstructing ring 245 removably fits. The rubber cap 244 includes a plurality of cuts formed radially from a penetration hole on the center. The obstructing ring 245 is made of rubber and obstructs the surface of the workpiece in the abutting state to the surface of the workpiece.

The sliding portion 223 slides (expands and contracts) to back and forth on a supporting arm 246 disposed to protrude to the left side from the upper portion of the main body case 221 using a slide bar 247 integrally disposed on the front cylinder 235 and a guide metal fitting 248 disposed on the supporting arm 246.

First, the slide bar 247 is made of metal such as aluminum, and coupled to the front cylinder 235 in parallel with a predetermined interval via a coupling plate 249 coupled to a left side surface of the front cylinder 235 in parallel. On a left side surface of the slide bar 247, two upper and lower rails 250, 250 are disposed parallel over the whole length. A front stopper 251 and a rear stopper 252, which are slidable along the rails 250, 250, are engaged with both rails 250, 250 from the upper and lower sides, so as to be disposed on the front and the rear across a stopper 253 disposed to protrude to the left outer side of the slide bar 247 from the supporting arm 246 in an arc shape. Between the rails 250, 250, a rack 254 constituted of a plurality of teeth is disposed. The front and rear stoppers 251 and 252 each include a lock button 255 projectingly biased upward in a state of being engaged with the rack 254.

Accordingly, when the lock button 255 is pushed to release the engagement with the rack 254, the front and rear stoppers 251 and 252 become to be slidable along the rails 250, 250, and when the push of the lock button 255 is released, the lock button 255 returns to the position projecting upward to be engaged with the rack 254, thus restricting the slide of the front and rear stoppers 251 and 252.

Figure 28:
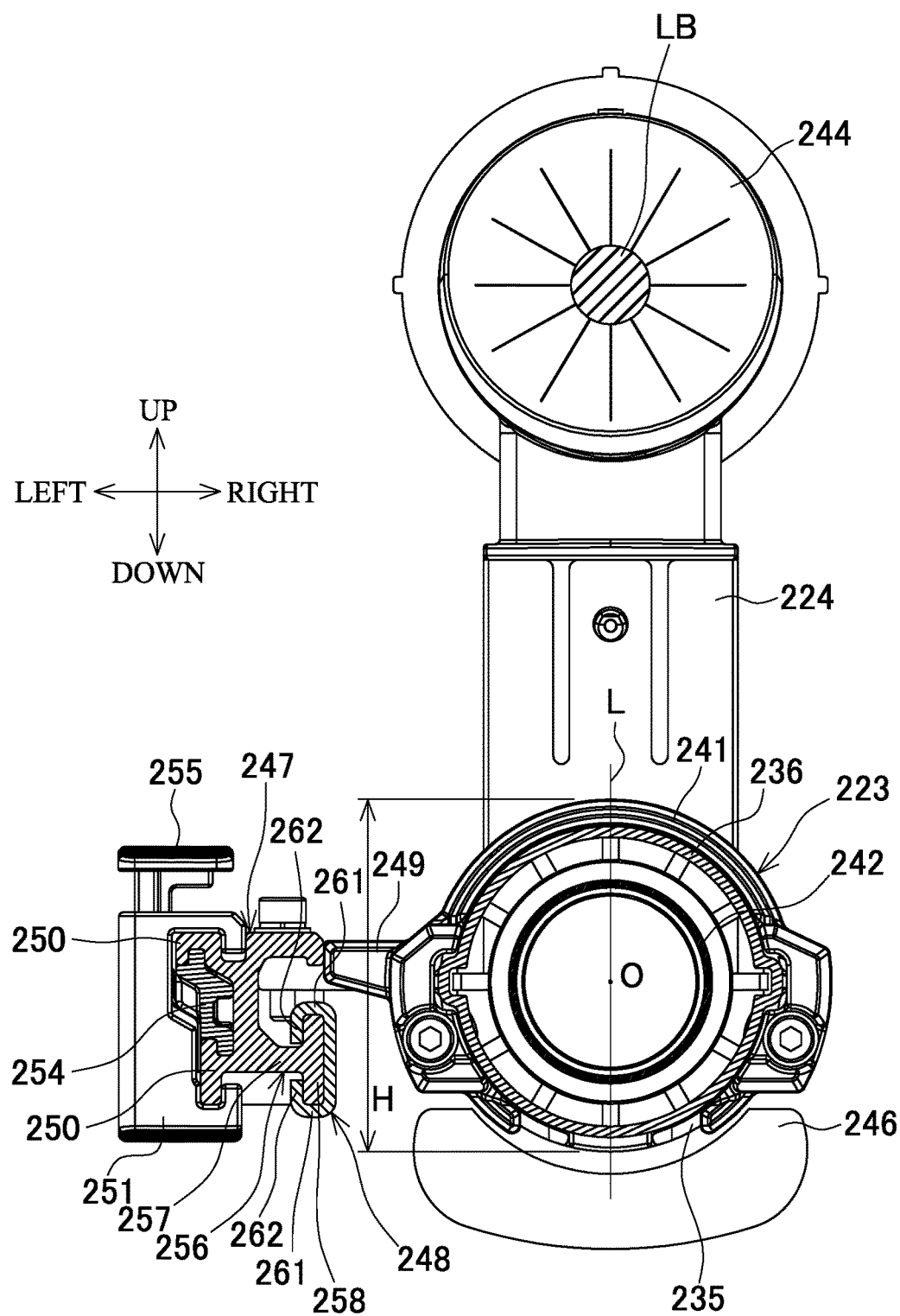
FIG. 28 is a cross-sectional view of a part taken along the line F-F in FIG. 23.

As illustrated in FIG. 28, on the right side lower portion of the slide bar 247, a guide rail 256 is integrally disposed. The guide rail 256 has a fallen T shape, and includes a lateral plate portion 257 projecting to the sliding portion 223 side and a vertical plate portion 258 consecutively disposed perpendicular to the lateral plate portion 257.

Figure 29:
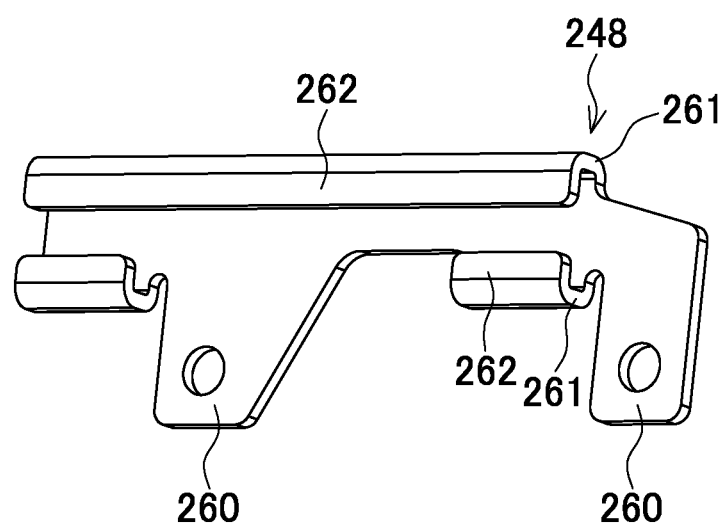
FIG. 29 is a perspective view of the guide metal fitting in a modification example.
Figure 30:
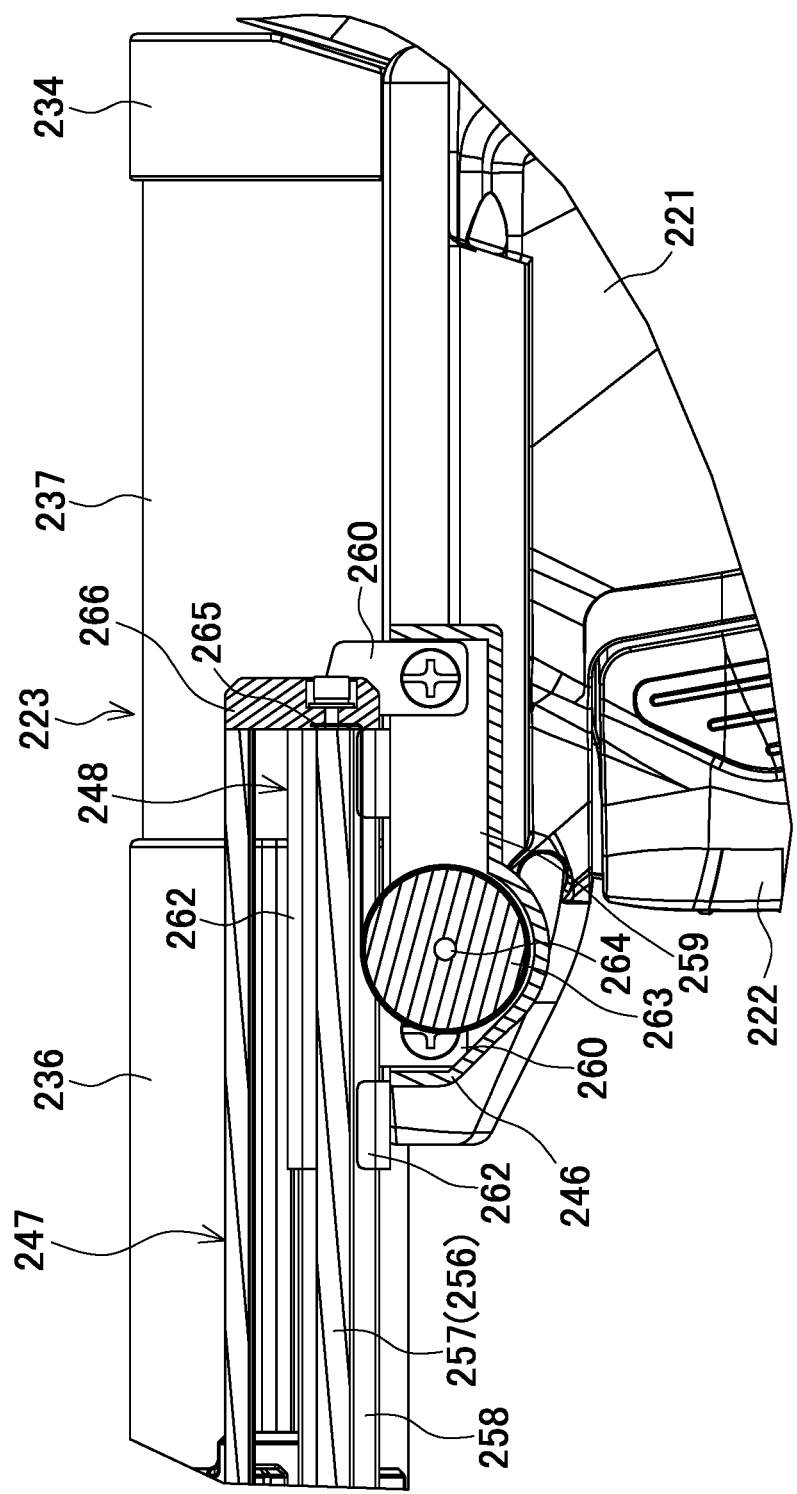
FIG. 30 is a cross-sectional view taken along the line G-G in FIG. 25.

Next, the guide metal fitting 248 is a metallic plate-shaped body, and as illustrated in FIGS. 29 and 30, the guide metal fitting 248 is vertically screwed on a left side surface of an installation plate 259 via installation pieces 260, 260. The installation plate 259 is vertically disposed between the sliding portion 223 and the slide bar 247 inside the supporting arm 246. The installation pieces 260, 260 are downwardly disposed at front and rear positions. On an upper edge and a lower edge except the installation pieces 260, 260 of the guide metal fitting 248, upper and lower raised portions 261, 261 and covering portions 262, 262 are disposed. The raised portions 261, 261 project to the left side. The covering portions 262, 262 are folded from distal ends of the raised portion 261, 261 to mutual facing sides. The vertical plate portion 258 of the guide rail 256 fits the raised portions 261, 261 and the covering portions 262, 262, and four surfaces of upper, lower, right, and left of the vertical plate portion 258 are supported by the guide metal fitting 248.

As illustrated in FIG. 28, the guide metal fitting 248 and the guide rail 256 here are disposed in a region on the left side with respect to a line L on a cross section passing through a center O of the sliding portion 223 in the horizontal direction and within a height (within a region where a part including the upper and lower raised portions 261, 261 and the guide rail 256 do not project from the sliding portion 223 in side view from the right side of the sliding portion 223) smaller than an up-down height H of the sliding portion 223.

Accordingly, the sliding portion 223 can be guided by only the guide metal fitting 248 via the slide bar 247, thus providing a compact guide structure. Since the guide rail 256 positioned between the sliding portion 223 and the slide bar 247 is guided, the possibility of causing a damage is reduced. Further, since the narrow part is guided, the occurrence of the tangle is reduced. Therefore, the sliding portion 223 is accurately guided. Furthermore, since the guide metal fitting 248 and the guide rail 256 are not exposed from the sliding portion 223 in side view from the right side, the damage from the outside (especially, the side) is reduced.

Figure 31:
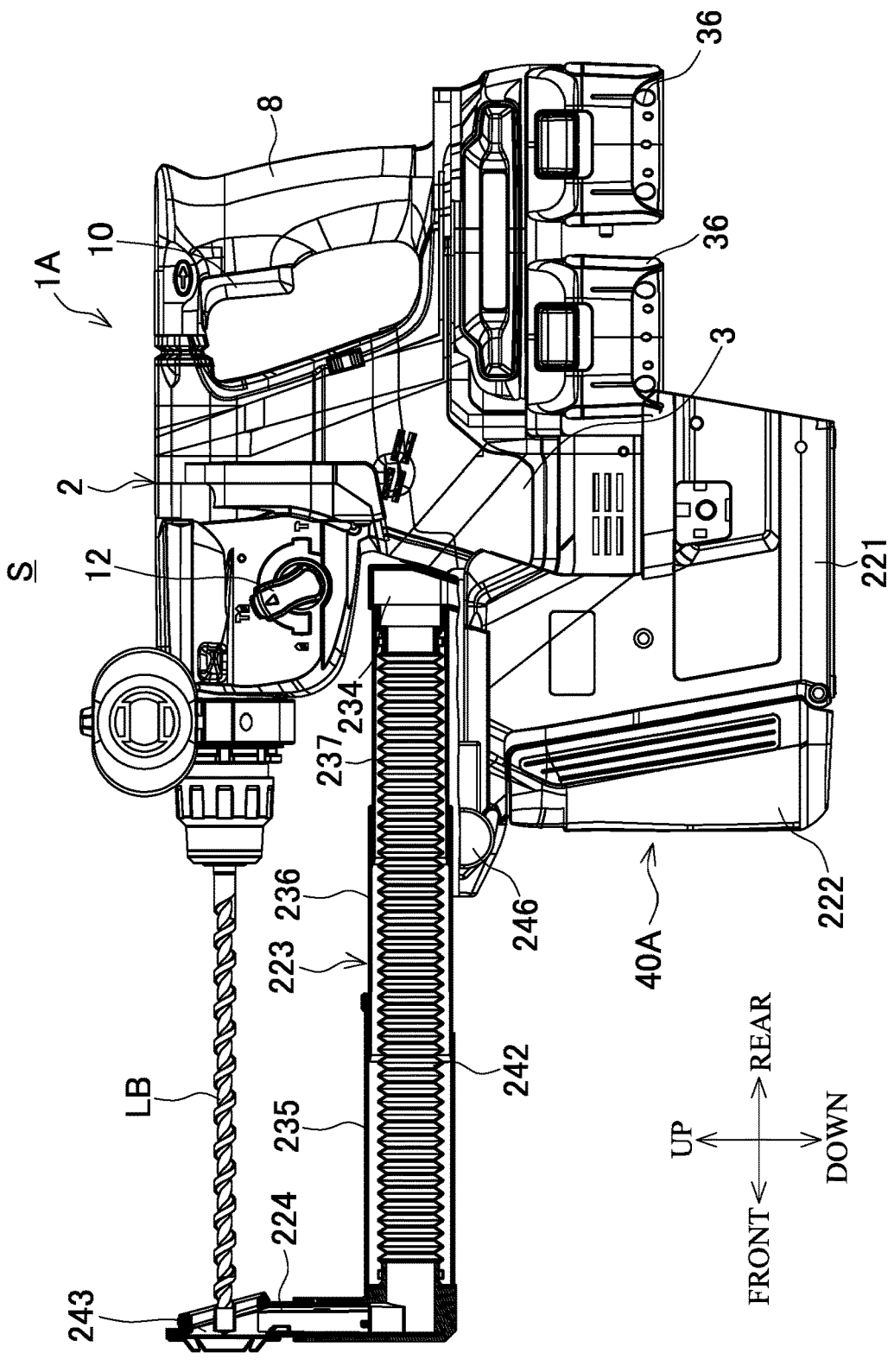
FIG. 31 is a side view of the dust collection system in a state where the sliding portion is expanded (illustrating a vertical cross section of only the sliding portion).

On the other hand, as illustrated in FIG. 30, downward the slide bar 247 inside the supporting arm 246, a spiral spring 263 is rotatably supported by a support pin 264 in the right-left direction. The spiral spring 263 has an end portion 265 on the outer peripheral side extracted rearward along the lower surface of the slide bar 247 and screwed to the rear end of the slide bar 247 so as to be coupled to a stopper 266 that restricts the retreated position of the rear stopper 252. Therefore, the slide bar 247 in the ordinary state is biased to the advance position in FIGS. 22 and 23, where the rear stopper 252 abuts on the stopper 253, with the front cylinder 235 by a tensile force of the spiral spring 263. In this state, as illustrated in FIG. 31, the front cylinder 235, the middle cylinder 236, and the rear cylinder 237 are each positioned at the frontmost position, thus the sliding portion 223 is expanded.

In the dust collection system S configured as described above, the initial position of the rear stopper 252 on the rails 250, 250 of the sliding portion 223 is adjusted such that the distal end of a bit (long bit or short bit) is positioned on the suction opening 243 of the nozzle 224 projectingly biased with the sliding portion 223, thus adjusting the position of the front stopper 251 in accordance with the drilling depth. Subsequently, the suction opening 243 is brought in contact with a surface to be drilled and the switch lever 10 of the hammer drill 1A is performed with a push operation to turn ON the switch, so as to drive the motor 4 to rotate the output shaft. At this time, when the drill mode or the hammer drill mode is selected by the change lever 12, the bit rotates to allow the surface to be drilled to be drilled.

Then, when the bit (here, the long bit LB is illustrated) passes through the suction opening 243 as the drilling proceeds, in the sliding portion 223, first, the front cylinder 235 retreats against the biasing by the spiral spring 263, and the middle cylinder 236 also retreats with the front cylinder 235 when the base end of the nozzle 224 abuts on the outer stopper portion 238 of the middle cylinder 236.

Here, the front cylinder 235 slides in a state where the guide rail 256 disposed on the integrated slide bar 247 is guided by the guide metal fitting 248 on the supporting arm 246. While the guide rail 256 as a part of the slide bar 247 is directly supported, since the vertical plate portion 258 of the guide rail 256 is supported by guide metal fitting 248 on the four surfaces of upper, lower, right, and left as described above, the guide rail 256 can smoothly slide without rattling.

Figure 32:
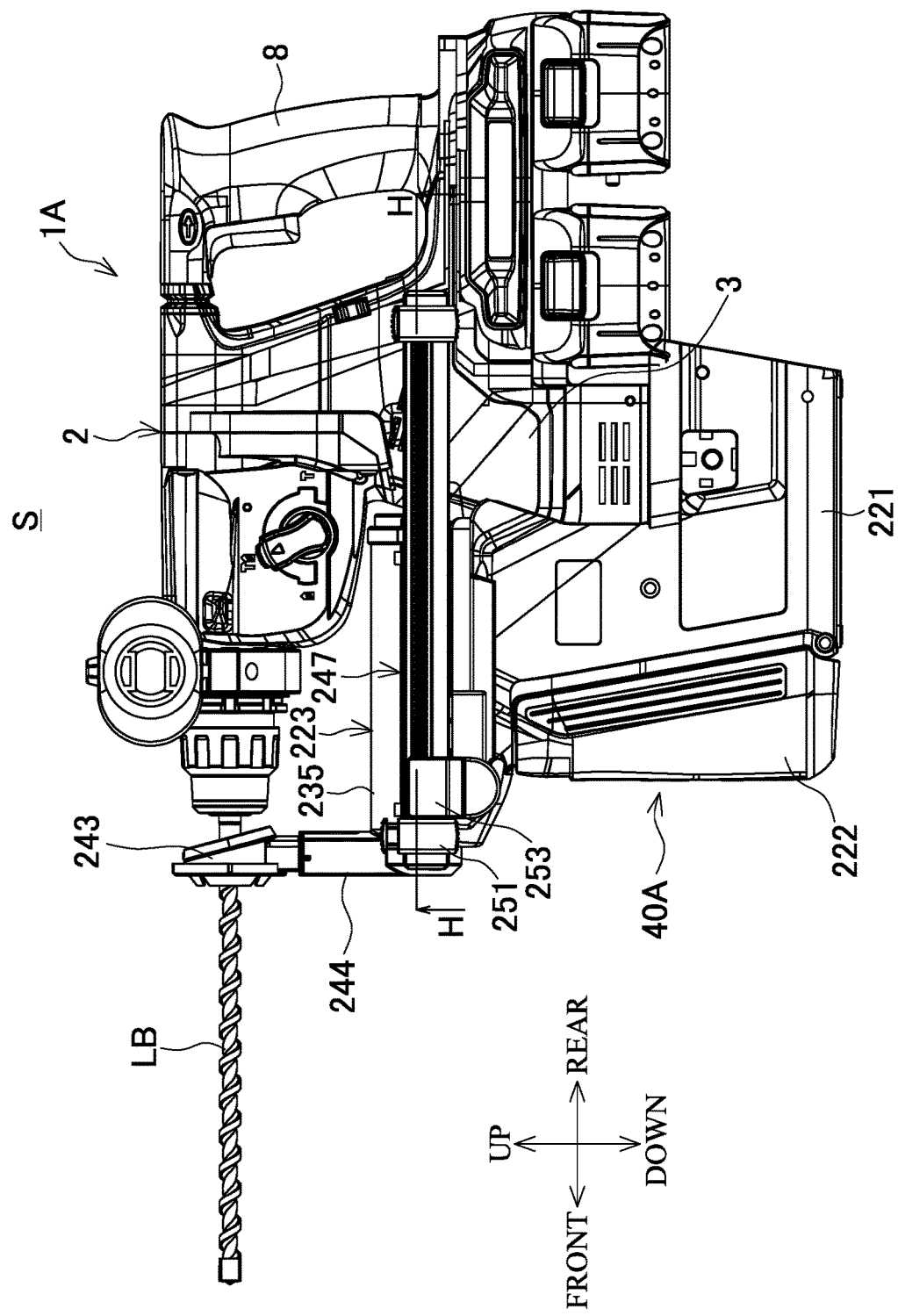
FIG. 32 is a side view of the dust collection system in a state where the sliding portion is contracted.
Figure 33:
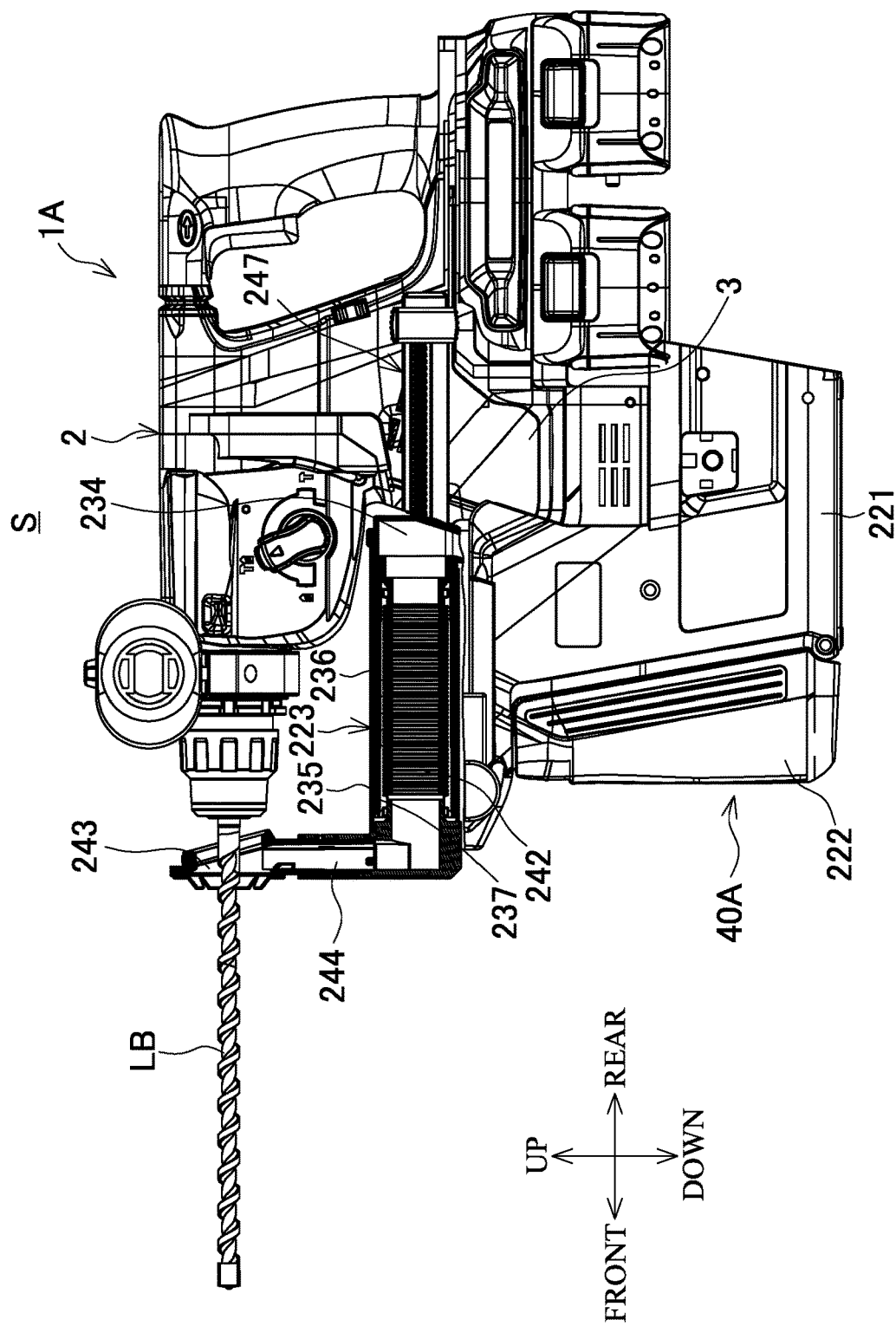
FIG. 33 is a side view of the dust collection system in a state where the sliding portion is contracted (illustrating a vertical cross section of only the sliding portion).
Figure 34:
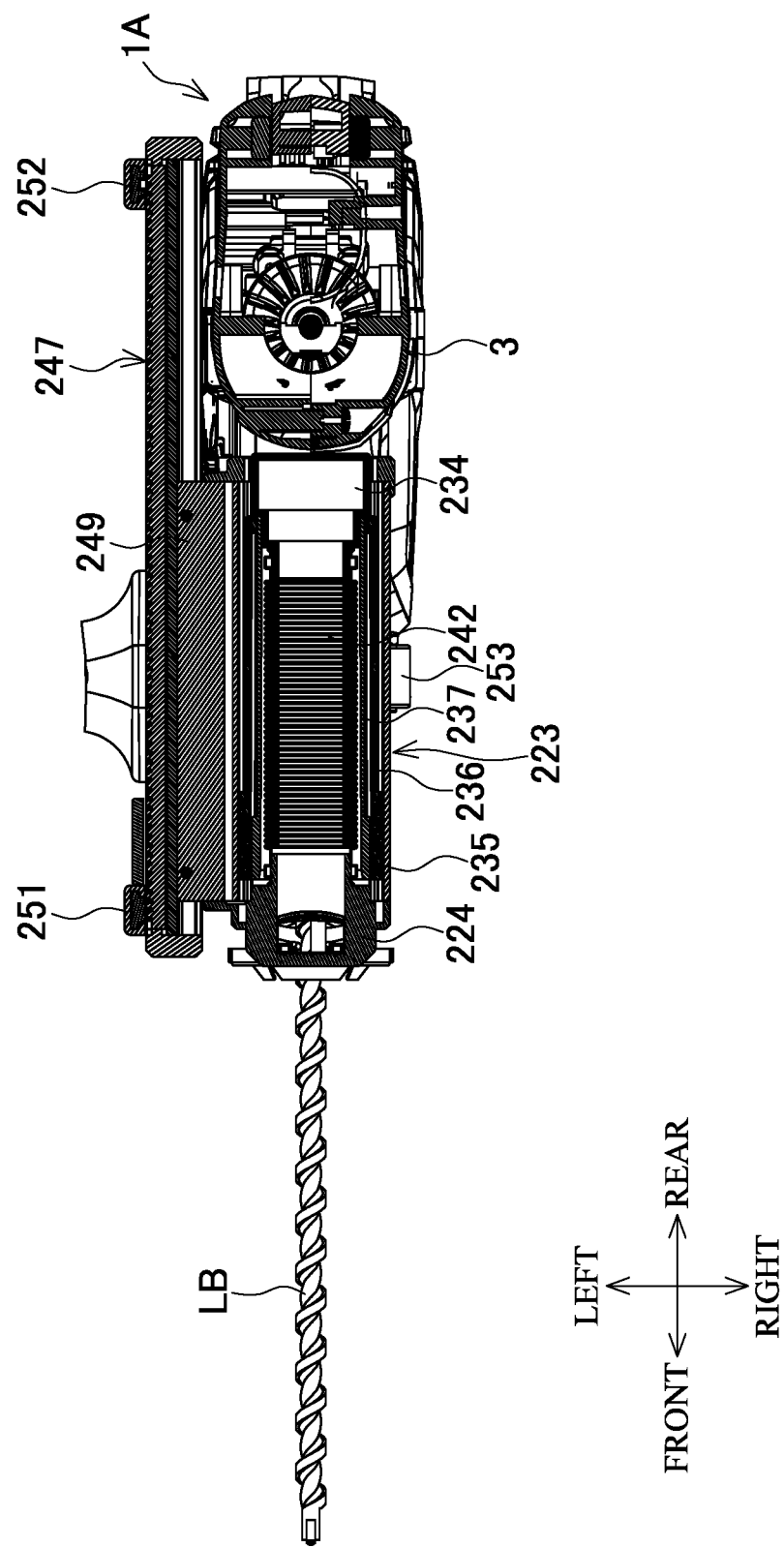
FIG. 34 is a cross-sectional view taken along the line H-H in FIG. 32.

When the drilling reaches the set drilling depth and the front cylinder 235 retreats, as illustrated in FIGS. 32 to 34, the rear cylinder 237, the middle cylinder 236, and the front cylinder 235 overlap on the outside in the order, and the sliding portion 223 contracts in two stages. At this time, the flexible hose 242 also contracts between the base end of the nozzle 224 and the receiving portion 234. Accordingly, while the slide bar 247 integrated with the front cylinder 235 retreats largely across the receiving portion 234, the slide bar 247 on a position projecting out to the left side from the main body case 221 does not interfere with the main body case 221 and the hammer drill 1A rearward the main body case 221.

On the other hand, the power feeding from the hammer drill 1A drives the motor 226 in the main body case 221 to rotate the dust collection fan 228, thus generating the suctioning force on the suction opening 243. Then, the air is suctioned from the suction opening 243 with the dust generated in drilling, passes through the flexible hose 242 via the nozzle 224, and passes through the guide passage 233 from the receiving portion 234 to reach the dust box 222. Then, the air passes through the filter 230 in the dust box 222 to reach the intake air chamber, and is discharged from the exhaust outlet 229 of the main body case 221. Thus, the dust in the air is captured by the filter 230 to be accumulated in the dust box 222.

As described above, according to the dust collector 40A and the hammer drill 1A in the above embodiment, the sliding portion 223 has the telescope structure constituted of a plurality of tubular bodies (the front cylinder 235, the middle cylinder 236, and the rear cylinder 237) having the diameter increasing forward in stages. Then, when the nozzle 224 retreats and the sliding portion 223 contracts, since the middle cylinder 236 and the rear cylinder 237 are housed in the front cylinder 235 having the largest diameter in order, the main body case 221 simply hold only the rear cylinder 237 having the minimum diameter. Accordingly, the sliding portion 223 is formed with the compact structure without upsizing the main body case 221.

Especially, here, the slide bar 247 slidably supported by the main body case 221 in the front-rear direction is coupled to the front cylinder 235 on the frontmost position parallel to the front cylinder 235. Then, even with the telescope structure having the large diameter in the front side, the front cylinder 235 is smoothly slid using the one slide bar 247. The slide bar 247 does not interfere with the main body case 221 and the hammer drill 1A, thus ensuring a required slide stroke even in a small model.

Furthermore, the sliding portion 223 that includes three tubular bodies and slides in two stages can increase the maximum stroke, thus ensuring supporting the long bit LB.

Not limiting to the left side of the tubular body at the frontmost position, the slide bar may be disposed on the right side and the lower side insofar as not interfering with the main body case and the electric power tool.

While the sliding portion has the telescope structure constituted of three tubular bodies in the above embodiment, the number of the tubular bodies is not limited to this, and a telescope structure constituted of four or more tubular bodies and a telescope structure constituted of two tubular bodies as illustrated in FIGS. 20 and 21 may be employed. Even in the configuration in FIGS. 20 and 21, a telescope structure constituted of three or more tubular bodies having the large diameter in the front side may be employed. The sliding portion may be shifted on the right side of the bit.

Then, in common to the respective modification examples, the lengths of the respective tubular bodies may be different, and a tubular body of a cornered cylinder (for example, a square cylinder, and a hexagonal cylinder) may be used not limiting to the cylinder. A rotation stop structure (for example, disposing a protrusion and a key on an outer surface of a tubular body on a small diameter side, and a depressed groove to which the protrusion fits on an inner surface of a tubular body on a large diameter side) may be disposed between the adjacent tubular bodies, and the flexible hose may be omitted to directly form the dust collecting route in the tubular body.

The dust collection portion is not limited the removable dust box, and may be formed such that the main body case includes the dust collecting chamber to be openable/closable by the lid body and similar body.

In addition, in common to the respective embodiments, here, while the spiral spring is used to projectingly bias the sliding portion, the biasing means is not limited to this, and a hose spring and similar spring may be used.

In the attaching and removing of the dust collector, while the above embodiment employs the structure where the lower side of the main body case is locked to rotate the upper side, conversely, a structure where the upper side of the main body case is locked to rotate the lower side can be employed. Furthermore, a lateral rotational attaching and removing structure where any one side of the right and left is locked to rotate another side can be also employed. The dust box is not limited to the detachable separate structure, and the dust box may be configured such that the main body case integrally includes the dust collection portion so as to discharge the dust by opening the lid body.

Then, in the configuration of the hammer drill, the motor may be disposed sideways, or a DC machine that uses a battery pack as a power source may be employed instead of an AC machine in the prior embodiment, and an AC machine may be employed in the latter modification example. Needless to say, not limited to the hammer drill, the above disclosures are applicable even to the other electric power tools such as an electric drill insofar as the dust collector is installable.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A dust collector for an electric power tool, comprising:
a main body case mountable to an electric power tool;
a tubular sliding portion disposed on the main body case, the sliding portion including a nozzle on a front end thereof, the nozzle including a suction opening; and
a dust collection portion configured to accumulate dust suctioned from the nozzle, wherein
the sliding portion includes a guided portion supported by a guiding portion disposed on the main body case, the guided portion is supported slidably in a front-rear direction, and the guiding portion and the guided portion are disposed in a region on a half side with respect to a line on a cross section passing through a center of the sliding portion, wherein
the guided portion is a protrusion projecting from the sliding portion, and
the sliding portion is located on the main body case such that the sliding portion comes on a position displaced to any of right and left sides from just below a tool bit of the electric power tool in a state where the main body case is installed on the electric power tool, the protrusion is disposed below the sliding portion, and the guiding portion and the protrusion are located entirely within a region in a lower side with respect to a center of the sliding portion.

2. The dust collector for the electric power tool according to claim 1, wherein
the protrusion is a rail-shaped protrusion, the protrusion includes guided surfaces in four directions viewed on a cross section perpendicular to the sliding direction.

3. The dust collector for the electric power tool according to claim 2, wherein
the sliding portion is located on the main body case such that the sliding portion comes on a position just below a tool bit of the electric power tool in a state where the main body case is installed on the electric power tool, the protrusion is disposed on a position displaced to any of right and left sides from just below the sliding portion, and the guiding portion and the protrusion are located within a region in any one of right and left sides with respect to a center of the sliding portion.

4. The dust collector for the electric power tool according to claim 1, wherein
the guiding portion is made of metal.

5. The dust collector for the electric power tool according to claim 1, wherein
the sliding portion has a telescope structure that includes a plurality of tubular bodies and is configured to expand and contract.

6. The dust collector for the electric power tool according to claim 1, wherein
the main body case includes a spiral spring configured to projectingly bias the sliding portion forward, and the spiral spring is coupled to the sliding portion passing between the guiding portion and the guided portion.

7. The dust collector for the electric power tool according to claim 1, wherein
the sliding portion has a telescope structure constituted of a plurality of tubular bodies having a diameter increasing forward in stages.

8. The dust collector for the electric power tool according to claim 7, wherein
a slide bar is coupled to the tubular body on a frontmost position parallel to the tubular body, the slide bar is supported by the main body case slidably in the front-rear direction.

9. The dust collector for the electric power tool according to claim 7, wherein
the sliding portion includes three of the tubular bodies and slides in two stages.

10. The dust collector for the electric power tool according to claim 7, wherein
the sliding portion is located on the main body case such that the sliding portion comes on a position displaced to any of right and left sides from just below a tool bit of the electric power tool in a state where the main body case is installed on the electric power tool.

11. The dust collector for the electric power tool according to claim 1, wherein
the main body case includes an exhaust outlet, the dust collection portion is a dust box disposed on the main body case to internally include a filter, a dust collecting route that passes through the filter from the suction opening to reach the exhaust outlet is disposed, the dust collecting route includes a flow path outlet that projects into the dust box in an upstream side of the filter, and the flow path outlet is formed in a tapered shape toward a projection direction.

12. The dust collector for the electric power tool according to claim 11, wherein
the flow path outlet has a tubular shape.

13. The dust collector for the electric power tool according to claim 11, wherein
the flow path outlet has a projection length equal to or more than one third of a depth of the dust box in the projection direction.

14. An electric power tool configured to mount the dust collector for the electric power tool according to claim 1.

15. A dust collector for an electric power tool, comprising:
a main body case mountable to an electric power tool;
a tubular sliding portion disposed on the main body case, the sliding portion including a nozzle on a front end thereof, the nozzle including a suction opening; and
a dust collection portion configured to accumulate dust suctioned from the nozzle, wherein
the sliding portion includes a guided portion supported by a guiding portion disposed on the main body case, the guided portion is supported slidably in a front-rear direction, and the guiding portion and the guided portion are disposed in a region on a half side with respect to a line on a cross section passing through a center of the sliding portion,
the main body case includes an exhaust outlet, the dust collection portion is a dust box disposed on the main body case to internally include a filter, a dust collecting route that passes through the filter from the suction opening to reach the exhaust outlet is disposed, the dust collecting route includes a flow path outlet that projects into the dust box in an upstream side of the filter,
the flow path outlet is formed in a tapered shape toward a projection direction, and
the dust box has a part ahead of the flow path outlet in the projection direction as a guide unit configured to change a direction of air discharged from the flow path outlet.

16. A dust collector for an electric power tool, comprising:
a main body case mountable to an electric power tool;
a tubular sliding portion disposed on the main body case, the sliding portion including a nozzle on a front end thereof, the nozzle including a suction opening; and
a dust collection portion configured to accumulate dust suctioned from the nozzle, wherein
the sliding portion includes a guided portion supported by a guiding portion disposed on the main body case, the guided portion is supported slidably in a front-rear direction, and the guiding portion and the guided portion are disposed in a region on a half side with respect to a line on a cross section passing through a center of the sliding portion,
the main body case includes an exhaust outlet, the dust collection portion is a dust box disposed on the main body case to internally include a filter, a dust collecting route that passes through the filter from the suction opening to reach the exhaust outlet is disposed, the dust collecting route includes a flow path outlet that projects into the dust box in an upstream side of the filter,
the flow path outlet is formed in a tapered shape toward a projection direction, and
the dust box includes a box main body where dust accumulates and a lid body configured to open and close the box main body, and the flow path outlet is disposed on the lid body.

17. The dust collector for the electric power tool according to claim 16, wherein
the box main body and the lid body are connected by hinge connection, and the flow path outlet has at least a surface positioned on an opposite side of the hinge connection as an inclined surface forming the tapered shape.

* * * * *